(12) United States Patent
Terlizzi et al.

(10) Patent No.: US 11,689,842 B2
(45) Date of Patent: *Jun. 27, 2023

(54) IDENTIFICATION OF CUSHIONING MEMBERS IN PERSONAL AUDIO DEVICES

(71) Applicant: Apple Inc., Cupertino, CA (US)

(72) Inventors: Jeffrey J. Terlizzi, San Francisco, CA (US); Kathleen A. Bergeron, Los Gatos, CA (US); Ali N. Ergun, Sunnyvale, CA (US); Dustin A. Hatfield, Los Gatos, CA (US); Ethan L. Huwe, Campbell, CA (US); Todd P. Marco, San Jose, CA (US); Jason Joseph LeBlanc, Castro Valley, CA (US); Robert D. Zupke, San Jose, CA (US); Michael B. Minerbi, San Francisco, CA (US); Prathamesh R. Bhagwat, San Francisco, CA (US); Daniel R. Bloom, Alameda, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/555,141

(22) Filed: Dec. 17, 2021

(65) Prior Publication Data

US 2022/0116697 A1    Apr. 14, 2022

Related U.S. Application Data

(63) Continuation of application No. 17/023,237, filed on Sep. 16, 2020, now Pat. No. 11,240,585.

(Continued)

(51) Int. Cl.
*H04R 25/00*    (2006.01)
*H04R 1/10*    (2006.01)

(52) U.S. Cl.
CPC ......... *H04R 1/1041* (2013.01); *H04R 1/1016* (2013.01); *H04R 2420/07* (2013.01); *H04R 2460/01* (2013.01)

(58) Field of Classification Search
CPC ............................ H04R 1/1041; H04R 1/1016
See application file for complete search history.

(56) References Cited

U.S. PATENT DOCUMENTS

| 5,708,724 A | * | 1/1998 | Burris ................... H04M 1/05 381/385 |
| 6,775,390 B1 | * | 8/2004 | Schmidt ............... H04R 5/0335 381/372 |

(Continued)

FOREIGN PATENT DOCUMENTS

| JP | S61193272 A | 8/1986 |
| JP | H08212281 A | 8/1996 |

(Continued)

OTHER PUBLICATIONS

IN202017041735, "First Examination Report", dated Jun. 6, 2022, 5 pages.

(Continued)

*Primary Examiner* — Simon King
(74) *Attorney, Agent, or Firm* — Kilpatrick Townsend & Stockton LLP

(57) ABSTRACT

A personal audio device (e.g., headphones, earphones) can have an earpiece (e.g., an ear cup or earbud) with a removable cushioning member (e.g., headphone cushions or ear tips for earbuds). The cushioning member can include an identification tag that encodes identification data for the cushioning member. When the cushioning member is attached to the earpiece, the identification tag is brought into proximity with a tag sensor in the earpiece and the earpiece can read the identification tag to determine identification data for the cushioning member. The identification data can (Continued)

be used to modify a behavior of the earpiece and/or of a host device communicably coupled to the earpiece.

21 Claims, 28 Drawing Sheets

Related U.S. Application Data

(60) Provisional application No. 62/925,952, filed on Oct. 25, 2019, provisional application No. 62/906,624, filed on Sep. 26, 2019, provisional application No. 62/902,239, filed on Sep. 18, 2019.

(56) References Cited

U.S. PATENT DOCUMENTS

| | | | |
|---|---|---|---|
| 9,210,500 | B2 | 12/2015 | Allen et al. |
| 2013/0345842 | A1 | 12/2013 | Karakaya et al. |
| 2015/0078573 | A1 | 3/2015 | Nicholson |
| 2015/0146880 | A1 | 5/2015 | Boni |
| 2016/0199001 | A1 | 7/2016 | Lee et al. |
| 2017/0078780 | A1 | 3/2017 | Qian et al. |
| 2017/0251313 | A1 | 8/2017 | Gustafsson |
| 2018/0376232 | A1* | 12/2018 | Hardi .................... H04R 1/1008 |
| 2020/0245057 | A1* | 7/2020 | Igarashi .................... H04R 3/04 |
| 2021/0089265 | A1* | 3/2021 | van Erven .............. G06F 3/167 |

FOREIGN PATENT DOCUMENTS

| | | |
|---|---|---|
| JP | 2001085927 A | 3/2001 |
| JP | 2009212772 A | 9/2009 |
| WO | 2013/158996 A1 | 10/2013 |
| WO | 2015/047363 A1 | 4/2015 |

OTHER PUBLICATIONS

"International Search Report and Written Opinion," dated Nov. 30, 2020 in International Application No. PCT/US2020/051306. 6 pages.

"Notice of Allowance," dated Oct. 13, 2021 in U.S. Appl. No. 17/023,237. 8 pages.

"Office Action," dated Oct. 17, 2022 in European Patent Application No. 20 771 960.0-1207. 5 pages.

"Notice of Reasons for Refusal," date of drafting Oct. 14, 2022 in Japanese Patent Application No. 2021-568415. 10 pages (includes English translation).

\* cited by examiner

| COMPONENT | Component Characteristics of Interest ||||  ID VALUE |
|---|---|---|---|---|---|
| | SIZE | COLOR | MATERIAL | MANUFACTURER | |
| Ear-Tip | small | white | --- | MFR 1 | P1 |
| Ear-Tip | medium | white | --- | MFR 1 | P2 |
| Ear-Tip | large | white | --- | MFR 1 | P3 |
| Ear-Tip | small | red | --- | MFR 1 | P4 |
| Ear-Tip | medium | red | --- | MFR 1 | P5 |
| Ear-Tip | large | red | --- | MFR 1 | P6 |
| Ear-Tip | small | --- | soft | MFR 2 | P7 |
| Ear-Tip | large | --- | soft | MFR 2 | P8 |
| Ear-Tip | small | --- | stiff | MFR 2 | P9 |
| Ear-Tip | large | --- | stiff | MFR 2 | P10 |

IDENTIFICATION OF CUSHIONING MEMBERS IN PERSONAL AUDIO DEVICES

CROSS-REFERENCES TO RELATED APPLICATIONS

This application is a continuation of U.S. application Ser. No. 17/023,237, filed Sep. 16, 2020, which claims the benefit of the following provisional applications: U.S. Application No. 62/902,239, filed Sep. 18, 2019; U.S. Application No. 62/906,624, filed Sep. 26, 2019; and U.S. Application No. 62/925,952, filed Oct. 25, 2019. The disclosures of these applications are incorporated herein by reference in their entirety.

BACKGROUND

This disclosure relates generally to personal audio devices such as earbuds and headphones and in particular to identification of removable cushioning members such as ear tips and cushions by a personal audio device that can support adaptive behavior based on the presence of a particular cushioning member.

A "personal audio device" refers to a device that produces sound to be heard by an individual user while limiting the audibility of that sound in an environment around the user. Examples of personal audio devices include headphones and earphones. Headphones generally include one or two audio-producing earpieces (also referred to as "ear cups") that are designed to be worn over the ear or on the ear. The ear cups are typically connected to a headband, which can help to hold the ear cups in place and can also provide an electrical connection between the ear cups. The ear cups are designed to be worn such that an audio-generating speaker contained in each ear cup directs sound toward an ear of the wearer. A cushion made of compliant material is typically provided around a peripheral portion of the ear cup in order to provide spacing between the speaker and the user's ear and to provide user comfort while wearing the headphones. The cushion may also provide sound insulation, preventing sound generated by the ear cups from leaking into the environment and/or preventing external sound from reaching the user's ears. Earphones generally include one or two audio-producing earpieces (also referred to as "earbuds") that are designed to be inserted into the user's ears (either into the ear canal or resting against the concha cavum) such that an audio-generating speaker contained in the earpiece (or earbud) is oriented toward the ear canal. An ear tip (also sometimes referred to herein as a "tip") made of soft material may be provided to cover at least the portion of the earbud that rests against the user's skin. Similarly to cushions of ear cups, an ear tip of an earbud may increase user comfort and provide at least some degree of sound insulation.

SUMMARY

Disclosed herein are various embodiments of one or more inventions related to personal audio devices (e.g., headphones, earphones) having an earpiece (e.g., an ear cup or earbud) with a removable cushioning member (e.g., headphone cushions or earphone tips). The cushioning member can include an identification tag that encodes identification data indicative of one or more properties or characteristics of the cushioning member (e.g., size, material, color, manufacturer, etc.). When the cushioning member is attached to the earpiece, the earpiece can read the identification data from the identification tag. For example, the earpiece can include a tag sensor that generates a signal responsive to an electrical, magnetic, electromagnetic, optical, geometrical, or mechanical characteristic of the identification tag and an identification (ID) logic circuit that decodes the signal from the tag sensor to extract the identification data. In some embodiments, based on the identification data, a controller of the personal audio device can modify the behavior of the earpiece. In some embodiments, the earpiece can communicate the identification data to a host device with which the personal audio device is communicably coupled (e.g., a phone, computer, media player, gaming device, or other device that can provide audio output to the personal audio device), and the host device can modify its behavior and/or a behavior of the earpiece based on the identification data.

According to some embodiments, a cushioning member for an earpiece of a personal audio device can include a body having a first surface to be placed in contact with a user's ear area and a second surface, at least the first surface being made of a compliant material; an attachment structure disposed on the second surface and configured to attach the cushioning member to an earpiece of a personal audio device; and an identification tag disposed at or near the second surface such that when the cushioning member is attached to the earpiece, the identification tag is in proximity to a tag sensor disposed in the earpiece. The identification tag can encode identification data for the cushioning member. The body can be shaped, e.g., as an ear cushion for a headphone or as an ear tip for an earphone.

Identification tags can be implemented using a number of different structures and techniques. For example, in some embodiments the identification tag can include any or all of: an arrangement of one or more magnets that encodes the identification data; a magnetic shunt having a shape that encodes the identification data; an inductive coil tuned to a resonant frequency, wherein the resonant frequency maps to the identification data; a surface optically encoded with the identification data; a passive near-field communication (NFC) or radio-frequency identification (RFID) tag encoded with the identification data; a pattern of metal and/or non-metal regions where presence or absence of metal in each region encodes the identification data; a feature affecting an acoustic property of the cushioning member; one or more electrical contacts coupled to an identification circuit element (e.g., a resistor or a coupling or absence of coupling to ground). In some embodiments, an identification tag is disposed within or on the attachment structure of the cushioning member.

According to some embodiments, an earpiece for a personal audio device can include: a housing having a proximal surface; a speaker disposed in the housing; an attachment structure disposed on the proximal surface and configured to attach to a cushioning member; a tag sensor disposed at or near the proximal surface and configured to generate a signal responsive to an identification tag of the cushioning member; identification logic coupled to the tag sensor and configured to determine identification data for the cushioning member based on the signal from the tag sensor; and a controller coupled to the identification logic and configured to modify a device behavior of the earpiece in response to the identification data. In some embodiments, the earpiece can also include a communication interface configured to communicate the identification data to a host device. The housing can be shaped, e.g., as an ear cup or earbud or the like. In some embodiments, the tag sensor can be disposed within or on the attachment structure.

A tag sensor can be implemented using a number of different sensors and technique. For instance, in some embodiments, a tag sensor can include a magnetic sensor configured to determine a magnetic orientation for each of one or more magnets of the identification tag. In some embodiments, the attachment structure can include one or more magnets and the tag sensor can include a magnetic sensor (e.g., a Hall sensor) configured to determine a geometric characteristic of a shunt element attached to the one or more magnets, where the geometric characteristic of the shunt element can encode identification information and thus serve as an identification tag. In some embodiments, the tag sensor can include a tuner circuit and the ID logic can be configured to operate the tuner circuit to determine a resonant frequency of a resonant circuit of the identification tag. In some embodiments, the tag sensor can include a light source and light detector configured to read an optically encoded surface of the identification tag. In some embodiments, the tag sensor can include an active near-field reader circuit configured to read a passive near-field tag of the identification tag. In some embodiments, the tag sensor can include one or more electrical contacts coupled to a circuit that can measure electrical parameters (e.g., resistance and/or grounded vs. ungrounded state) associated with corresponding contacts of the identification tag. In some embodiments, the tag sensor can include an array of resonant coils and the identification logic is configured to detect an effect of the identification tag on each of the resonant coils. In some embodiments, the tag sensor can include a NFC or RFID reader circuit configured to read an identification tag implemented as an NFC or RFID tag circuit. In some embodiments, the tag sensor can include a microphone and the identification logic can be configured to drive the speaker to produce a sound and to analyze an acoustic response from the microphone, wherein the acoustic response is affected by the identification tag.

Various types of identification data can be encoded in an identification tag in a cushioning member and read by a tag sensor and identification logic in an earpiece. For instance, identification data can indicate one or more of: a size of the cushioning member; a color of the cushioning member; a device class of the cushioning member; a manufacturer of the cushioning member; a model identifier of the cushioning member; a unique identifier of the cushioning member; and/or an active capability supported by the cushioning member. In some embodiments, the identification data can be a parameter value that can be mapped to indicia of one or more attributes of the cushioning member (e.g., size, color, device class, manufacturer, model, unique identifier, etc.).

According to some embodiments, a method of identifying a cushioning member for a personal audio device can include detecting, by an earpiece of a personal audio device, presence of a cushioning member; operating, by the earpiece of the personal audio device, reader circuitry to read identification data from an identification tag located on the cushioning member; and modifying a device behavior based at least in part on the identification data. In some embodiments, the earpiece of the personal device can modify its own behavior in response to the identification data. Additionally or instead, the earpiece of the personal device can transmit the identification data to a host device with which the personal audio device interoperates, and the host device can modify its own behavior and/or the behavior of the personal audio device in response to the identification data.

Various types of behavior modification can be implemented in response to identification data. For example, modifying the device behavior can include modifying an audio characteristic including any or all of: modifying an equalizer setting for the personal audio device; modifying an active noise cancellation profile of the personal audio device; applying a sound filtering algorithm for the personal audio device; modifying a volume limit for the personal audio device; and/or applying a saved user preference associated with the identification data. In some embodiments where the personal audio device interoperates with a host device, the host device can modify an image of the personal audio device in a graphical user interface of the host device based at least in part on the identification data. In some embodiments where the identification data includes data indicating whether the cushioning member supports an advanced capability, modifying the device behavior includes enabling or disabling the advanced capability based on the identification data. In some embodiments where the identification data includes data indicating a size of the cushioning member, modifying the device behavior includes using the size of the cushioning member in a cushioning-member fitting process.

The following detailed description, together with the accompanying drawings, will provide a better understanding of the nature and advantages of the claimed invention.

DETAILED DESCRIPTION

Figure 1:
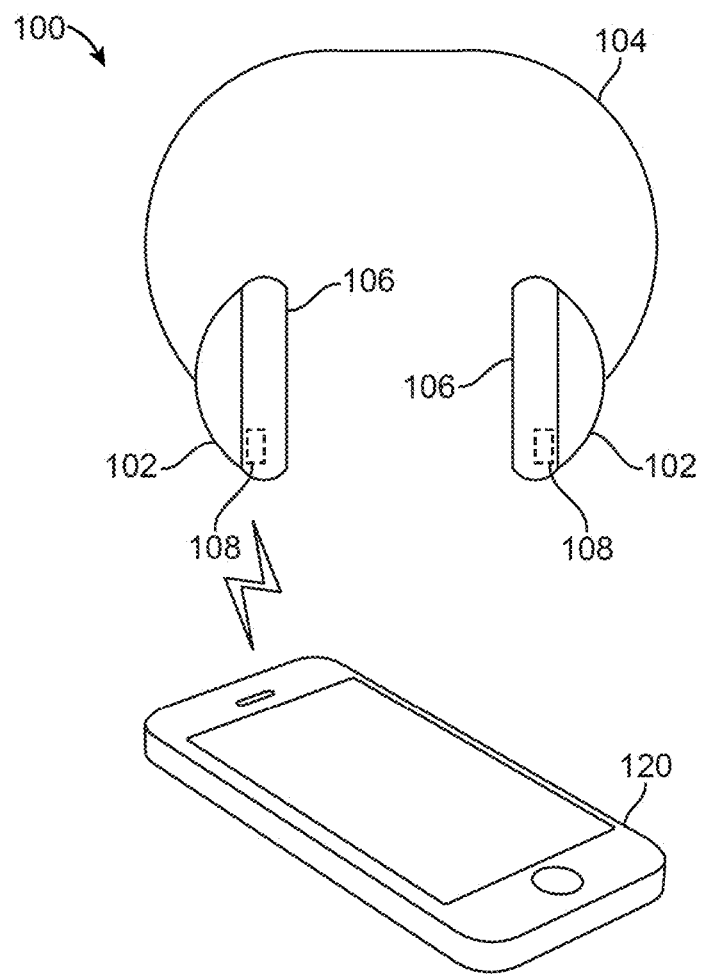
FIG. 1 shows a first example of a personal audio device according to some embodiments.

Disclosed herein are various embodiments of one or more inventions related to personal audio devices (e.g., headphones, earphones) having an earpiece (e.g., an ear cup or earbud) with a removable cushioning member (e.g., headphone cushions or earphone tips). The cushioning member can include an identification tag that encodes identification data indicative of one or more properties or characteristics of the cushioning member (e.g., size, material, color, manufacturer, etc.). When the cushioning member is attached to the earpiece, the earpiece can read the identification data from the identification tag. For example, the earpiece can include a tag sensor that generates a signal responsive to an electrical, magnetic, electromagnetic, optical, geometrical, or mechanical characteristic of the identification tag and an identification (ID) logic circuit that decodes the signal from the tag sensor to extract the identification data. In some embodiments, based on the identification data, a controller of the personal audio device can modify the behavior of the earpiece. In some embodiments, the earpiece can communicate the identification data to a host device with which the personal audio device is communicably coupled (e.g., a phone, computer, media player, gaming device, or other device that can provide audio output to the personal audio device), and the host device can modify its behavior and/or a behavior of the earpiece based on the identification data.

In various embodiments, the identification tag in a cushioning member can be a "passive" tag that does not require a power source in order to be read by an earpiece. For example, the identification tag can be implemented using a piece of magnetic material or a magnetic shunt whose presence and/or geometry can be detected using a magnetic sensor (e.g., Hall effect sensor) located in the earpiece. As another example, the identification tag can be implemented using an optical pattern (e.g., alternating regions of high and low reflectivity) that can be scanned using a tag sensor that includes a light source and light detector located in the earpiece. As yet another example, the identification tag can be implemented as a passive NFC or RFID tag, and the tag sensor in the earpiece can include a compatible NFC or RFID reader. As still another example, the identification tag can be implemented as an inductive coil or other circuit having a particular resonant frequency, and the tag sensor in the earpiece can include a tuner that can be operated to determine the resonant frequency of the coil. As a further example, identification data can be encoded in the acoustic characteristics of a particular cushioning member, and a tag sensor can measure the acoustic characteristics or other characteristics related to the acoustic characteristics such as load impedance of an amplifier. The foregoing are examples of "contactless" identification techniques that do not require an electrically conductive connection between the earpiece and the cushioning member. In other embodiments, a passive identification tag can be implemented using one or more electrical contacts. For instance, an identification tag can include a set of contacts, each of which may or may not be connected to a ground contact, and the reader circuitry in the earpiece can connect to the contacts and read the identification data by detecting the connection pattern of contacts in the identification tag. As another example, an identification tag can be implemented using a resistor having a specific resistance value coupled between two electrical contacts, and the reader circuitry in the earpiece can read the identification data by measuring the resistance value. In still other embodiments, the identification tag can be active, and the tag can draw enough power from the earpiece to communicate identification data to the reader circuitry via a wired or wireless communication channel.

In various embodiments, the identification data obtained from an identification tag can include or represent any information that distinguishes one cushioning member from another. For example, the identification data can represent any or all of: a manufacturer identifier; a model identifier; a size identifier; a color identifier; a device-class identifier (e.g., indicating presence or absence of various capabilities or characteristics); a unique serial number; and/or other information as desired. In some embodiments, an identification tag can encode a numerical value that can be mapped by ID logic in the earpiece (or in a connected host device) to a particular set of characteristics of the cushioning member.

In various embodiments, the earpiece and/or a host device can change different aspects of their behavior based on the identification data. For example, an equalizer setting can be selected or modified based on the identification data. Hearing-protection settings can be modified, including, e.g., limiting the speaker volume of the earpiece, modifying an active noise cancellation profile for the earpiece, and so on. User interface behavior can also be modified. For instance, if a host device has a display that shows an image of the personal audio device, the displayed image can be modified to match the currently-attached cushioning member.

In various embodiments, the earpiece and/or a host device can use the identification data in connection with monitoring the condition of the cushioning member. For example, a host device can track the age or total lifetime usage of a particular cushioning member and suggest replacement at an appropriate interval.

In various embodiments, the earpiece and/or a host device can use the identification data to assist with sizing of a cushioning member. For example, ear tips, which fit into a user's ear, may come in several sizes to accommodate variations in the size of human ears. During fitting of ear tips, an audio leakage test can be performed to assess the fit of a particular tip. Based on the results of the leakage test and identification data indicating a size of the tested tip, the earpiece (or a host device) can suggest a specific tip size to try next.

In various embodiments, the earpiece and/or a host device can use the identification data to activate or deactivate advanced capabilities that may be supported by certain cushioning members. For example, it is contemplated that an advanced cushion or ear tip (or other cushioning member) may include one or more biometric monitoring devices such as a pulse sensor, temperature sensor, or moisture (e.g., perspiration) sensor that can provide sensor data to the earpiece, which in turn can communicate the sensor data to a host device or use the data internally (e.g., to generate an audible indication related to the sensor data). Based on whether the identification data indicates that the cushioning member supports a particular monitoring capability, the earpiece can automatically enable or disable its receiver(s) for the monitoring data.

1. Personal Audio Devices With Removable Cushioning Members

FIG. 1 shows a first example of a personal audio device according to some embodiments, in the form of headphones 100. Headphones 100 include a pair of earpieces 102 and a band 104 that mechanically connects earpieces 102. In some embodiments, band 104 may also provide electrical connections between earpieces 102. Earpieces 102 (also referred to as ear cups) can be made of rigid materials such as rigid plastic and/or metal. Earpieces 102 can be designed and shaped to fit on top of or around the pinnae of the user's ears, covering the concha cavum. Earpieces 102 can incorporate one or more speakers to produce sound directed toward the user's ears, control electronics to operate the speakers, a signal interface to receive audio signals in digital or analog format, one or more user input controls (e.g., one or more touch sensitive areas on a surface of one or both of earpieces 102), and other components that can be of generally conventional design.

To provide user comfort, cushions 106 can be detachably attached to earpieces 102. For example, cushions 106 can have one or more protruding attachment structures (e.g., on the side facing earpieces 102) that snap into complementary slots, holes, clips, or other attachment structures in earpieces 102, or earpieces 102 can have one or more protruding attachment structures that snap into complementary slots, holes, or other attachment structures in cushions 106. In some embodiments, magnetic attachment structures can be provided in addition to or instead of mechanical attachment structures. For example, earpieces 102 can have magnets disposed at various locations on an interface surface that faces cushions 106. Such magnets can be disposed, e.g., near the periphery of earpieces 102. Cushions 106 can include metal shunts, magnets, or the like at corresponding locations on the interface surface; any structure that is attracted to the magnets in earpieces 102 can be used. These examples are illustrative, and a particular attachment structure or combination of attachment structures is not critical to understanding the present disclosure.

Cushions 106 can be formed with a core of foam or other compressible material surrounded by a compliant structural layer that helps to define a shape of a periphery of cushions 106 without imparting rigidity. One or more additional textile layers can be applied if desired, e.g., for user comfort, durability, and/or esthetic appearance. In some embodiments, cushions 106 can incorporate rigid structural elements in areas that do not contact the user's skin during use. For example, cushions 106 can include a rigid frame that can be made of plastic or the like, and a rigid frame can facilitate attachment and replacement of cushions 106. For example, a frame can incorporate mechanical and/or magnetic attachment structures.

For purposes of the present disclosure, it is assumed that multiple types of cushions 106 that are compatible with the same headphones 102 exist. In various embodiments, different types of cushions 106 may be distinct from each other in terms of size, color, materials, audio performance (e.g., how effectively a particular cushion blocks ambient sound), and/or other characteristics. It is also assumed that different types of cushions 106 are user-interchangeable; that is, a user may attach cushions 106 of different types to the same earpieces 102 at different times. To facilitate identification of which cushions 106 are currently attached to earpieces 102, each cushion 106 can include an identification tag 108 that encodes identification data indicating the type of cushion. Identification tag 108 can be read by earpiece 102, allowing the behavior of headphones 100 to automatically adapt based on the particular type of cushion 106 that is attached at any given time. Specific examples are described below.

In some embodiments, headphones 100 can operate as an accessory to a host device 120. Host device 120 can be, for example, a smart phone, a tablet computer, a laptop computer, a desktop computer, a wearable device (e.g., a smart watch), a game console or portable gaming device, or any other electronic device that provides audio output. Headphones 100 can connect to host device 120 via a wired or wireless communication channel that supports transfer of audio data (in digital and/or analog formats) from the host device to the personal audio device. In some embodiments, the communication channel can be bidirectional, allowing headphones 100 to communicate information to host device 120. For example, headphones 100 can communicate cushion identification data read from identification tag 108 to host device 120, and host device 120 can modify its behavior based on the cushion identification data received from headphones 100. Specific examples are described below. It should be understood that information other than audio signals and cushion identification data can also be communicated between headphones 100 and host device 120. For example, headphones 100 can provide a user input interface that includes, e.g., tactile controls (buttons, touch-sensitive surfaces, or the like) and/or a microphone for voice input, and headphones 100 can communicate user input to host device 120. Such interaction is not relevant to understanding the present disclosure.

Figure 2:
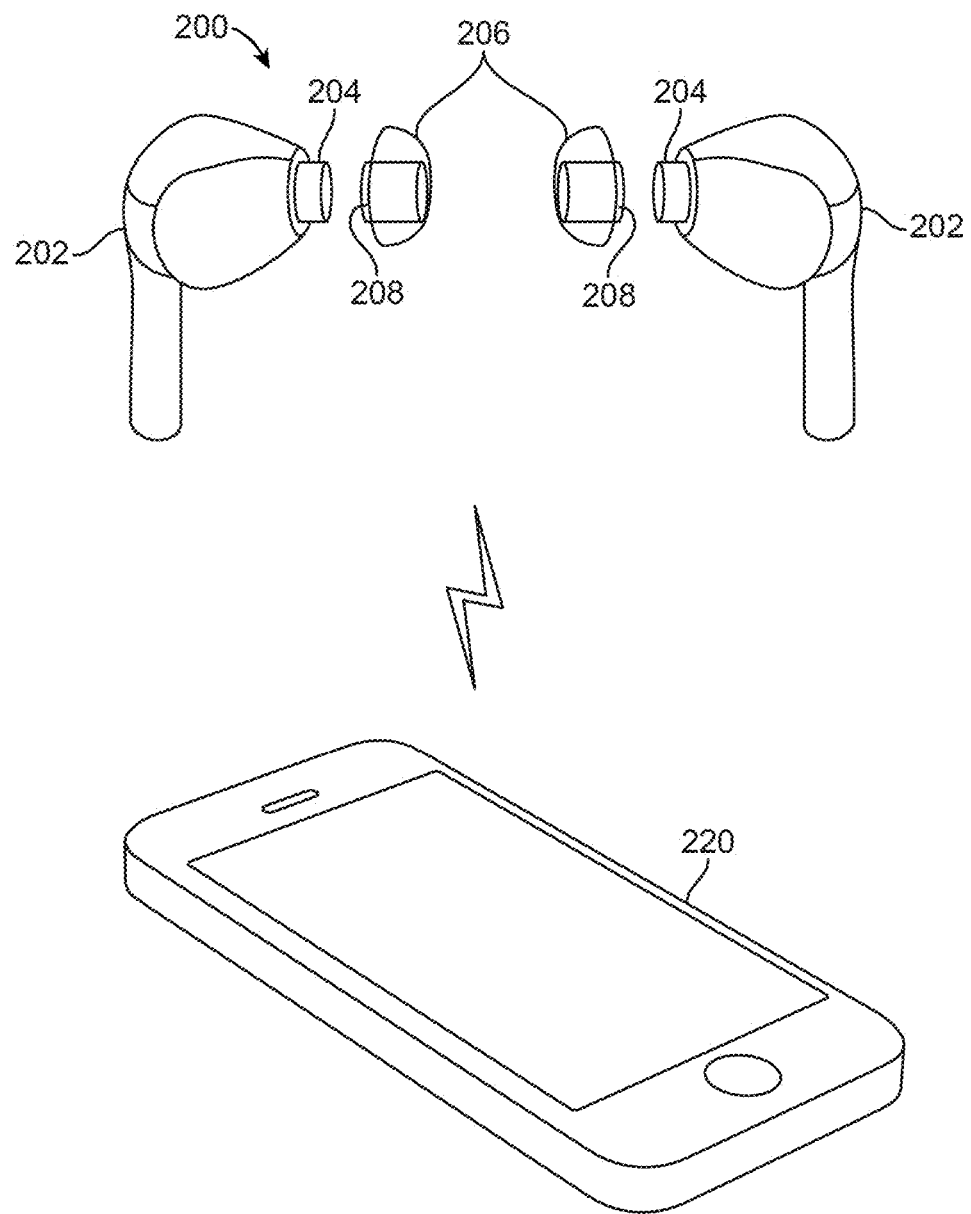
FIG. 2 shows a second example of a personal audio device according to some embodiments.

FIG. 2 shows a second example of a personal audio device according to some embodiments, in the form of earphones 200. Earphones 200 include a pair of earpieces 202. Earpieces 202 (also referred to as earbuds) can be made of a rigid material such as plastic and/or metal and can incorporate one or more speakers to produce sound, control electronics to operate the speakers, one or more user input controls (e.g., one or more touch sensitive areas on a surface of one or both of earpieces 202), and so on. In this example, earpieces 202 each have an end portion 204 designed to rest within an outer portion of a user's ear canal, and in some embodiments, the speaker(s) can be located in or adjacent to end portion 204.

To provide user comfort, ear tips (also referred to herein as "tips") 206 can be detachably attached to end portion 204. For example, tips 206 can include a base portion that can slide over and tightly fit to end portion 204. As with earcups 102 and cushions 106 of FIG. 1, a variety of mechanical and/or magnetic attachment structures may be used, and a particular attachment mechanism is not critical to understanding the present disclosure.

In some embodiments, ear tips 206 can be formed from silicone rubber or other compressible elastic material. The body of ear tips 206 can be shaped according to the general dimensions of an ear canal or other portion of an ear, and the body can include an attachment portion that is compatible with the form factor of end portion 204 so that ear tips 206 can be attached to (and removed from) earbuds 202 at end portion 204. The body of ear tips 206 can also include a compliant outer lobe or cup that extends outward from the attachment portion, providing a pliable surface to contact the user's ear canal.

For purposes of the present disclosure, it is assumed that multiple types of ear tips 206 that are compatible with the same earpieces 202 exist. In various embodiments, different types of ear tips 206 may be distinct from each other in terms of size, color, materials, audio performance (e.g., how effectively a particular ear tip blocks external sound), and/or other characteristics. It is also assumed that different types of ear tips 206 are user-interchangeable; that is, a user may attach ear tips 206 of different types to the same earpiece 202 at different times. To facilitate identification of which ear tips 206 are currently attached to earpieces 202, each ear tip 206 can include an identification tag 208 that encodes information data indicating the type of ear tip. Identification tag 208 can be read by earpiece 202, allowing the behavior of earphones 200 to automatically adapt based on the particular type of ear tip 206 that is attached at any given time. Specific examples are described below.

Similarly to headphones 100, earbud set 200 can operate as an accessory to a host device 220. Host device 220 can be, for example, a smart phone, a tablet computer, a laptop computer, a desktop computer, a wearable device (e.g., a smart watch), a game console or portable gaming device, or any other electronic device that provides audio output. Earbuds 202 can connect to host device 220 via a wired or wireless communication channel that supports transfer of audio data (in digital and/or analog formats) from the host device to the personal audio device. In some embodiments, the communication channel can be bidirectional, allowing earbuds 202 to communicate information to host device 220. For example, earbuds 202 can communicate tip identification data read from identification tag 208 to host device 220, and host device 220 can modify its behavior based on the tip identification data received from earbuds 202. Specific examples are described below. It should be understood that information other than audio signals and tip identification data can also be communicated between earbuds 202 and host device 220. For example, earbuds 202 can provide a user input interface that includes, e.g., tactile controls (buttons, touch-sensitive surfaces, or the like) and/or a microphone for voice input, and earbuds 200 can communicate user input to host device 120. Such interaction is not relevant to understanding the present disclosure.

It is to be understood that headphones 100 and earbud set 200 are illustrative of personal audio devices having earpieces and cushioning member suitable for use in embodiments of the claimed invention. Identification tags as described herein can be incorporated into any cushion, ear tip, or other replaceable user-contacting component (referred to as a "cushioning member") of a personal audio device and can be read by any compatible earpiece to which the cushioning member is attached. Earpieces and compatible cushioning members can have a variety of form factors and attachment structures.

In some embodiments, cushion-member identification data can be used locally within the personal audio device to modify one or more of its behaviors. Additionally or instead, the personal audio device can transmit cushion-member identification data to a host device with which the personal audio device is communicably coupled, and the host device can modify one or more of its behaviors in response to the cushion-member identification data.

2. Identification of Cushioning Members

According to various embodiments, identification of cushioning members can be based on an identification tag disposed in or on the cushioning member that can be read using reader circuitry (or a tag sensor) in the earpiece. Examples will now be described. In the following description, some examples are described with reference to ear cups and cushions (e.g., ear cups 102 and cushions 106 of headphones 100 of FIG. 1), and some examples are described with reference to earbuds and ear tips (e.g., earbuds 202 and ear tips 206 of FIG. 2). It will be appreciated that examples described with reference to ear cups and cushions can be applied to earbuds and ear tips and vice versa.

2.1. Earpiece Systems with ID Tag and Tag Sensor

Figure 3:
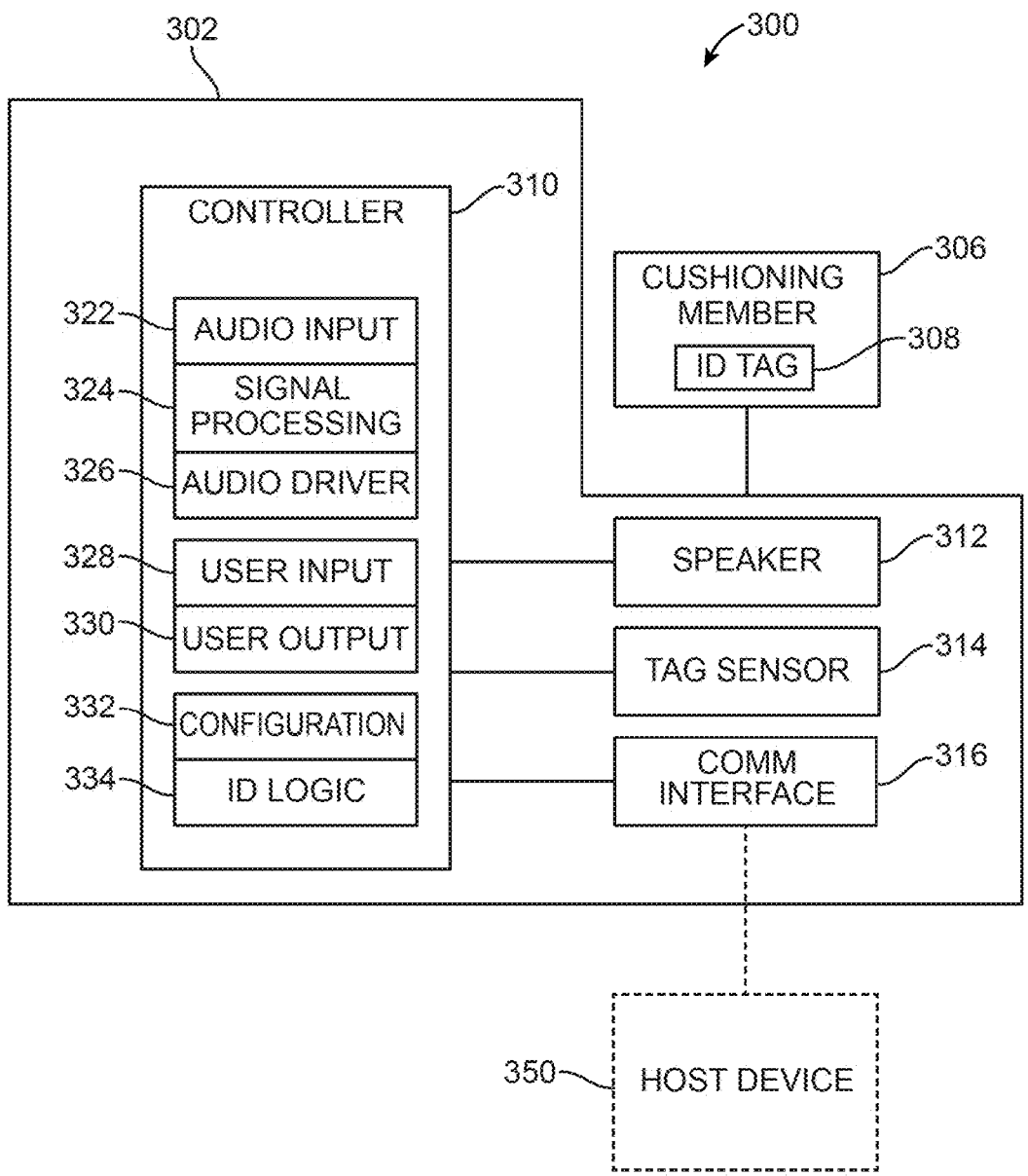
FIG. 3 shows a simplified block diagram of an earpiece system according to some embodiments.

FIG. 3 is a simplified block diagram of an earpiece system 300 according to some embodiments. Earpiece system 300 includes an earpiece 302 and a removable cushioning member 306. Earpiece 302 (which can be, e.g., ear cup 102 of FIG. 1 or earbud 202 of FIG. 2) can include a controller 310, a speaker 312, a tag sensor 314, and a communication interface 316. Controller 310 can be implemented, e.g., using one or more microprocessors, microcontrollers, field-programmable gate arrays (FPGAs), or other logic circuits of generally conventional design. In some embodiments, controller 310 can be housed entirely within earpiece 302 (e.g., within ear cup 102 of FIG. 1 or earbud 202 of FIG. 2).

Removable cushioning member 306 (which can be, e.g., cushion 106 of FIG. 1 or ear tip 206 of FIG. 2) can include an identification (ID) tag 308. ID tag 308 can include any storage medium or structure capable of encoding cushion-member identification data in a physical form that can affect a signal generated by tag sensor 314 of earpiece 302. ID tag 308 can be passive or active and can operate with or without an electrical connection. Example implementations of ID tag 308 and corresponding tag sensors 314 are described below.

Speaker 312 can be an audio speaker of generally conventional design located within earpiece 302 and can include, e.g., an amplifier and a transducer to convert electrical signals to motion of a vibrational element (e.g., a diaphragm). Tag sensor 314 can be disposed within earpiece 302 and configured to generate a signal responsive to identification data encoded in identification tag 308 of cushioning member 306; examples are described below. Communication interface 316 can include hardware and/or firmware components to enable communication with a host device 350 (e.g., host device 120 of FIG. 1 or host device 220 of FIG. 2). For example, communication interface 316 can implement standard wireless communication protocols such as Bluetooth, Wi-Fi, or the like. In addition or instead, a wired communication interface supporting a standard or custom communication protocol or other communication interface can be supported.

Controller 310 can incorporate a number of logic modules implemented using any appropriate combination of hardware and/or software components. For example, audio input module 322 can receive audio data (in digital or analog format) from an audio source. The audio source can be, for example, an internet connection, a radio receiver, a microphone positioned to detect ambient sounds in the environment, an analog audio input jack, host device 350 communicating with earpiece 302 via communication interface 316, or any other audio source. Signal processing module 324 can perform signal-processing operations on the audio data, including decoding, digital-to-analog conversion, equalization (e.g., selectively adjusting amplitudes associated with different frequency bands), volume control (e.g., adjusting analog signal amplitude), generating audio data associated with an active noise-cancellation operation, mixing of audio data from multiple audio sources (e.g., mixing noise-cancellation audio with audio input such as music or voice data), and/or any other type of audio signal processing that may be desired. Audio driver 326 can drive speaker 312 based on an audio signal output from signal processing module 324. User input module 328 can support user interaction. For example, user input module 328 can be configured to receive and interpret voice commands from the user and/or to detect operation of a user control located on the personal audio device or elsewhere. Based on received user input, user input module 328 can provide instructions to other modules of controller 310, e.g., to select an audio source, control volume, or adjust other settings, or send instructions or data to a host device via communication interface 316. In some embodiments, controller 310 can also include a user output module 330 to provide information or prompts to the user, e.g., using audible, visual, or tactile indicators. Configuration module 332 can store configuration settings (e.g., one or more equalizer profiles, volume limits, noise-cancellation profiles, etc.). In some embodiments, some or all of the configuration settings can be associated with identification data for a particular type of cushioning member 306 or with characteristics of cushioning member 306 that can determined from the identification data. Accordingly, configuration module 332 can modify the behavior of signal processing module 324 and/or other components of controller 310 based on identification data obtained from ID tag 308 of cushioning member 306. ID logic module 334 can obtain signals from tag sensor 314 responsive to ID tag 308 and can interpret the signals to "read" the identification data encoded in ID tag 308. ID logic module 304 can provide the identification data read from ID tag 308 to configuration module 332, to other modules or components of controller 310, and/or to host device 350 via communication interface 316.

It will be appreciated that earpiece system 300 is illustrative and that variations and modifications are possible. An earpiece system may include other components not shown in FIG. 3, such as microphones or touch-sensors to receive user input. Where a host device is present, some or all of the signal processing, user input, user output, and configuration operations described above as being performed by controller 310 can instead be performed by appropriate components (including one or more suitably programmed processors) of the host device. It should also be understood that, although a single earpiece system 300 is shown, a personal audio device can include a pair of earpiece systems 300 (e.g., as shown in FIGS. 1 and 2). In some embodiments, one instance of earpiece system 300 may act as a primary earpiece that communicates with the host device and relays signals and/or other information to and from the other (secondary) earpiece; in other embodiments, each instance of earpiece system 300 can communicate directly with the host device, and the pair of earpiece systems might or might not also communicate directly with each other.

Further, while earpiece system 300 is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the claimed invention can be realized in a variety of apparatus including electronic devices implemented using different combinations of circuitry and software.

According to various embodiments, earpiece 302 can read ID tag 308 when tag sensor 314 is brought into proximity with ID tag 308. The term "reading" of an identification tag is used herein to refer to the process of obtaining signals from tag sensor 302 responsive to physical characteristics of a particular ID tag 308 and interpreting the signals (e.g., using ID logic 334) to extract identification data. The extracted identification data can be, e.g., a numerical value (or bit string) that represents identifying information such as a cushion size, color, material composition, manufacturer, and/or other characteristic(s). To enable reading of ID tag 308 by earpiece 302, ID tag 308 and tag sensor 314 can be disposed on or within cushioning member 306 and earpiece 302 in respective locations such that attaching cushioning member 304 to earpiece 302 results in bringing ID tag 308 and tag sensor 314 into proximity to tag sensor 314 such that signals generated by tag sensor 314 are affected by specific properties of ID tag 308 that are different for different cushion types.

Figure 4A:
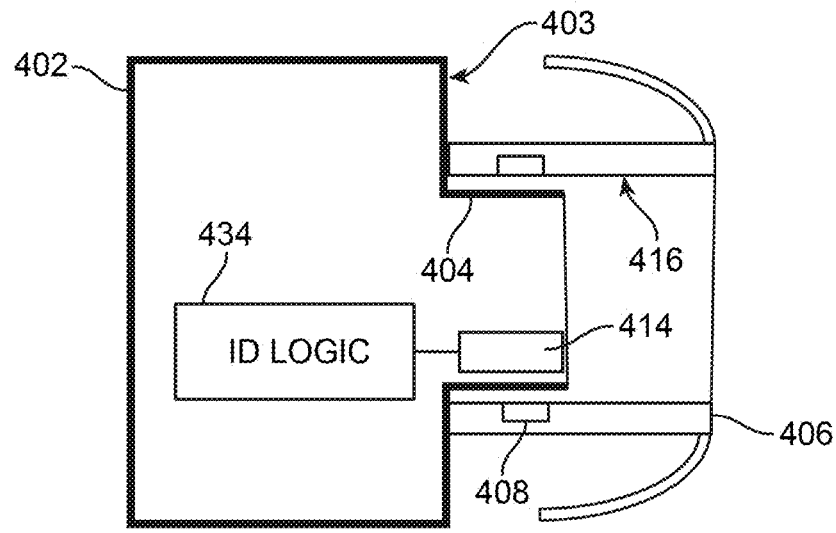
FIGS. 4A-4C show simplified cross-section views of an earpiece and an ear tip according to some embodiments.
Figure 4B:
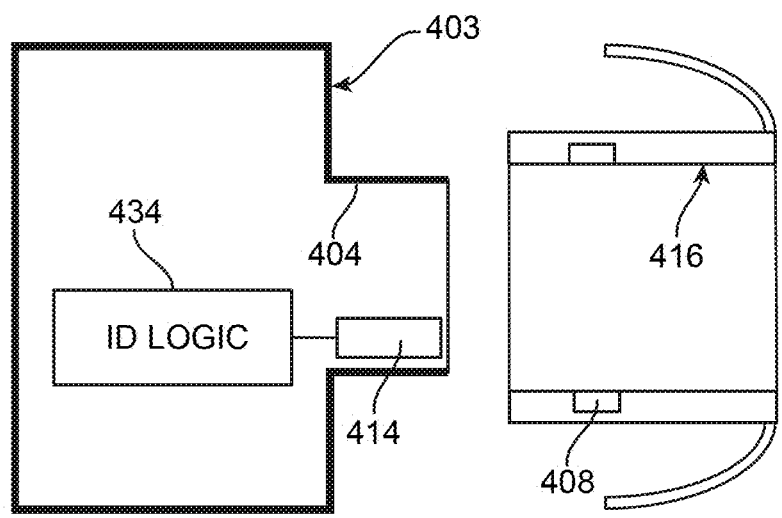

By way of example, FIGS. 4A and 4B show simplified cross-section views of an earpiece 402 and an ear tip 406 according to some embodiments. Earpiece 402 and ear tip 406 can correspond to earbud 202 and ear tip 206 of FIG. 2 and can implement earpiece system 300 of FIG. 3. In FIG. 4A, ear tip 406 is shown attached to earpiece 402, and in FIG. 4B, ear tip 406 is shown detached from earpiece 402.

Earpiece 402 can have a proximal surface 403 oriented toward ear tip 406. A central portion of proximal surface 403 can project forward to form an end portion 404, which can be shaped as a circular or elliptical cylinder extending from proximal surface 430. (In some embodiments, end portion 404 can be tapered along its length; other shapes may also be used.) In some embodiments, end portion 404 (or other portions of proximal surface 403) can include mechanical retention features (not shown) to hold ear tip 406 in place when ear tip 406 is attached to end portion 404; examples include an elastic ring or spring, a lip, a protrusion or notch, or the like. In some embodiments, a magnetic retention feature can be provided. In some embodiments, ear tip 406 can be made of an elastic material, and the elasticity of ear tip 406 can hold ear tip 406 in place over end portion 404. End portion 404 can include a tag sensor 414 disposed near a sidewall surface of end portion 404. Tag sensor 414 can include various electrical, magnetic, electromagnetic, optical, mechanical, acoustic, or other components; examples are descried below. Depending on implementation, tag sensor 414 can extend around part or all of the circumference of end portion 404. Tag sensor 414 can be coupled to an ID logic circuit 434, which need not be in proximity to the surface of end portion 404 and can be disposed anywhere within earpiece 402. ID logic circuit 434 can be configured to interpret signals from tag sensor 414 and to output cushion-member identification data.

Ear tip 406 can include a sidewall 416, which can define a central opening 407 complementary to end portion 404 of earbud 402. For instance, the inner surface of sidewall 416 can be shaped as a circular or elliptic cylinder. A flexible lobe or cap 420 can extend outward from a front end of sidewall 416. Flexible lobe 420 can be designed to fit into a user's ear canal and to be pliant to conform to the shape of the ear canal. Sidewall 416 can be more rigid than flexible lobe 420 and can include retention features such as an elastic ring or spring, a lip, a protrusion or notch, a magnetic retention feature, or the like, and the retention features of sidewall 416 can be complementary to corresponding retention features of end portion 404 of ear tip 406. In some embodiments, the elasticity and static friction of sidewall 416 may serve as retention features.

Sidewall 416 can include ID tag 408, which can be embedded within sidewall 416 or disposed on the inner surface of sidewall 416. ID tag 408 can be or include one or more physical features that are distinct for different cushion types. These physical features can encode identification information specific to a particular type of ear tip 406; examples are described below. Depending on implementation, ID tag 408 can have a cylindrical or curved shape that extends around part or all of the circumference of sidewall 416. This can facilitate reading of ID tag 408 in cases where sidewall 416 is circularly symmetric or does not have a preferred attachment orientation.

Figure 4C:
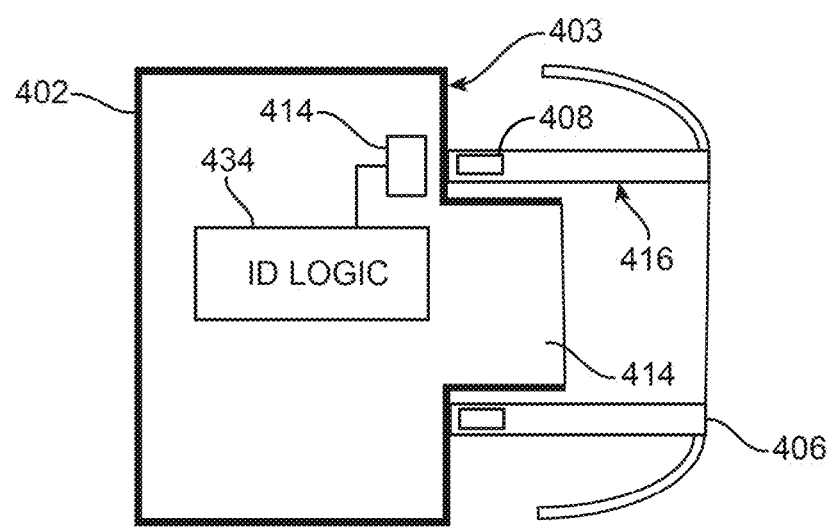

As shown in FIG. 4A, when ear tip 406 is attached to earpiece 402, tag sensor 414 is in close enough proximity to ID tag 408 of ear tip 406 to allow tag sensor 414 to generate a signal responsive to the distinctive physical features of identification tag 408; in other words, tag sensor 414 can generate different signals in response to ID tags 408 that have different physical features. The arrangement of identification tag 408 and tag sensor 414 is also implementation-dependent. For instance, if ear tip 406 has a preferred rotational orientation, identification tag 408 can be positioned such that it is in proximity to tag sensor 414 when ear tip 406 is in the preferred rotational orientation. (In such cases, failure to read the identification data can trigger a notification to the user that ear tip 406 may be incorrectly oriented.) In embodiments where ear tip 406 does not have a preferred rotational orientation, identification tag 408 and tag sensor 414 can be arranged to allow tag sensor 414 to read identification tag 408 regardless of rotational orientation. For instance, identification tag 408 can extend around the circumference of sidewall 416, or multiple copies of identification tag 408 can be disposed around the circumference of sidewall 416 such that one copy can be within proximity for reading by tag sensor 414 regardless of rotational orientation. As another example, tag sensor 414 can extend around the periphery of end portion 404, or multiple copies of tag sensor 414 can be disposed around the periphery of end portion 404 such that one copy can be within proximity of ID tag 408 regardless of rotational orientation. Other arrangements that provide proximity between ID tag 408 and tag sensor 414 can also be used. For example, as shown in FIG. 4C, tag sensor 414 can be disposed at or near a peripheral portion of proximal surface 403, and identification tag 408 can be disposed at or near a corresponding location on the rear surface of sidewall 416.

Figure 5:
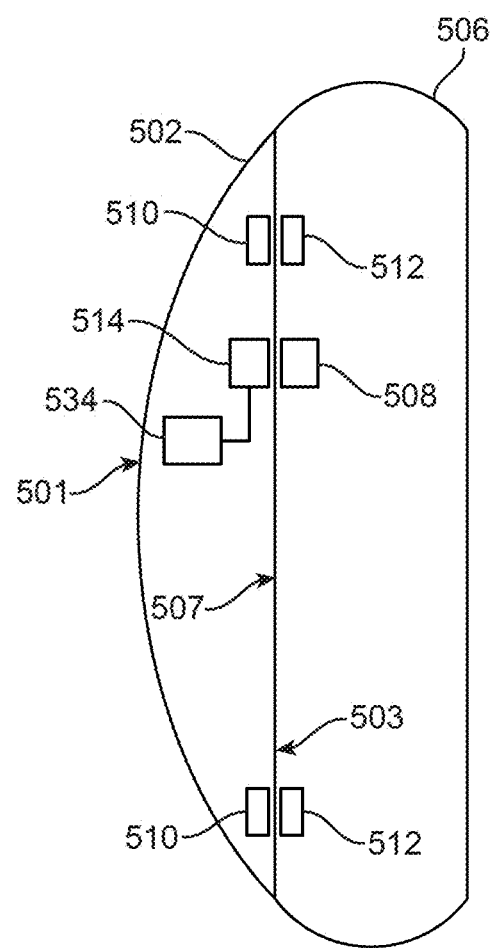
FIG. 5 shows a simplified cross-section view through an earpiece and cushion according to some embodiments.

In various embodiments, proximity-based identification tags can be implemented in cushioning members having other form factors. For example, FIG. 5 shows a simplified cross-section view through an earpiece 502 and cushion 506 according to some embodiments. Earpiece 502 and cushion 506 can correspond to ear cup 102 and cushion 106 of FIG. 1. In this example, earpiece 502 includes magnets 510 disposed at various locations around the periphery of earpiece 502, close to interface surface 503. Magnets 510 can be, e.g., rare earth magnets such as NdFeB magnets and can be polarized in a desired orientation. Tag sensor 514 can be disposed in a region between magnets 510, near or on interface surface 507. Tag sensor 514 can be coupled to an ID logic circuit 534, which need not be in proximity to interface surface 503 and can be disposed anywhere within earpiece 502. ID logic circuit 534 can be configured to interpret signals from tag sensor 514 and to output cushion-member identification data.

Cushion 506 can include attachment structures 512 that align with magnets 510. Attachment structures 512 can be magnets polarized to be attracted to magnets 510, or attachment structures 512 can be shunts made of a material that is attracted to magnets 510. ID tag 508 can be disposed in a region between attachment structures 512, near or on interface surface 507, in a location such that when attachment structures 512 become magnetically attached to magnets 510, ID tag 508 is in proximity to tag sensor 514, allowing tag sensor 514 to read ID tag 508. In various embodiments, ID tag 508 and tag sensor 514 can be any distance from attachment structures 512 and magnets 510. Further, in some embodiments, the shape of attachment structures 512 can be used to represent cushion identification data, and a physically distinct ID tag 508 is not required. (An example of encoding identification data in a magnetic attachment structure is described below.)

Figure 6A:
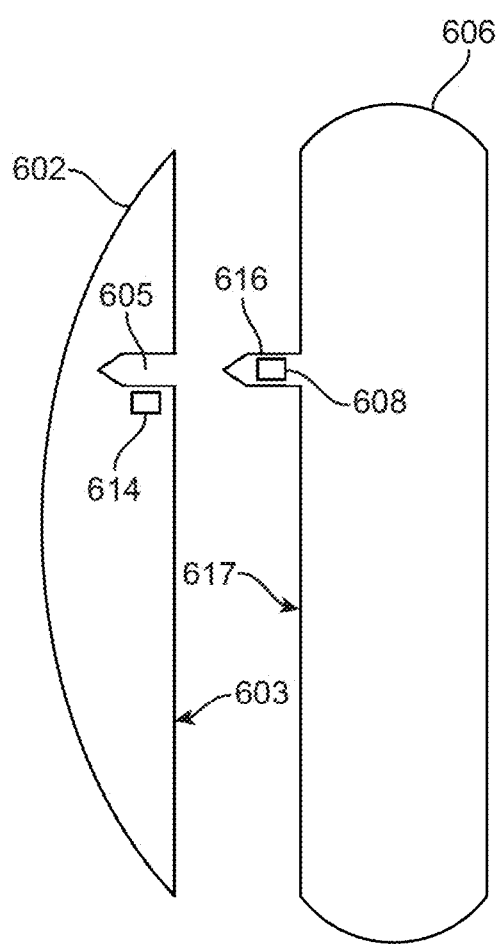
FIGS. 6A and 6B show simplified cross-section views through an earpiece and cushion according to some embodiments.
Figure 6B:
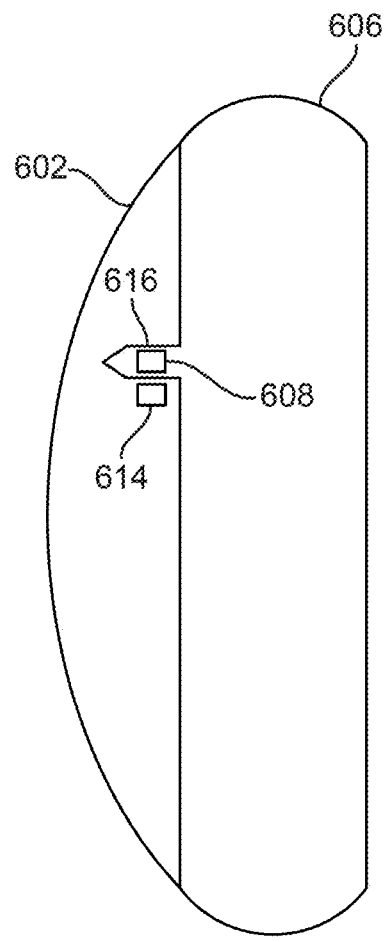

In some embodiments, mechanical attachment structures may be used to attach an ear cup to a cushion, in addition to or instead of magnetic structures. FIGS. 6A and 6B show simplified cross-section views through an earpiece 602 and cushion 606 according to some embodiments. Earpiece 602 and cushion 606 can correspond to ear cup 102 and cushion 106 of FIG. 1. In FIG. 6A, cushion 606 is shown detached from earpiece 602, and in FIG. 6B, cushion 606 is shown attached to earpiece 602. Earpiece 602 has a proximal surface 603 oriented toward cushion 606. Proximal surface 603 can include a recess 605, and a tag sensor 614 can be disposed adjacent to (or on a surface of) recess 605. Cushion 606 has a protruding structure 616 that extends outward from a rear surface 617 of cushion 606. An ID tag 608 can be positioned within or on a surface of protruding structure 616. In some embodiments, protruding structure 616 and/or recess 605 can include additional mechanical retention features (not shown) to hold cushion 606 in place when cushion 606 is attached to earpiece 602.

As shown in FIG. 6B, when cushion 606 is attached to earpiece 602, tag sensor 614 is in proximity to ID tag 608. (The arrangement is complementary to that shown in FIGS. 4A and 4B, in that in FIGS. 4A and 4B, the protruding part is on the earpiece and holds the tag sensor while the recess is in the cushioning member and holds the ID tag.) It should be understood that a reverse arrangement can also be provided, in which a recess is formed in cushion 606 and a peg or other protruding part extends from proximal surface 603 of earpiece 602 into the recess.

It should be understood that these examples of positioning of ID tags and corresponding tag sensors are illustrative and that many variations are possible. Interface surfaces can be curved or flat as desired. Mechanical or magnetic retention features for attaching a cushioning member to an earpiece can be located in various positions on the earpiece or cushioning member, and the ID tag and tag sensor can be located within or adjacent to or spaced apart from retention features as desired. Depending on the particular identification technology, the ID tag and/or tag sensor can be visible on the interface surface, or they can be covered by surface material.

An identification tag (or ID tag) can be or include any physical structure that encodes identification data. In other words, an ID tag can be or include any physical structure that can be constructed or formed in multiple versions such that the version of the structure present in each type of cushioning member that is to be distinguished differs from the version present in other types in a way that can be detected by a sensor (i.e., that results in the sensor generating a distinctive signals for each version of the structure). Sections 2.2-2.9 describe examples of physical structures that can be used to encode identification data and corresponding tag sensors and ID logic that can read the identification data.

2.2. Magnetic Identification

As described above with reference to FIG. 5, a cushion can attach to an earpiece magnetically. In some embodiments, magnetic-attachment components in a cushion can be leveraged to provide an identification tag. An example will now be described.

Figure 7A:
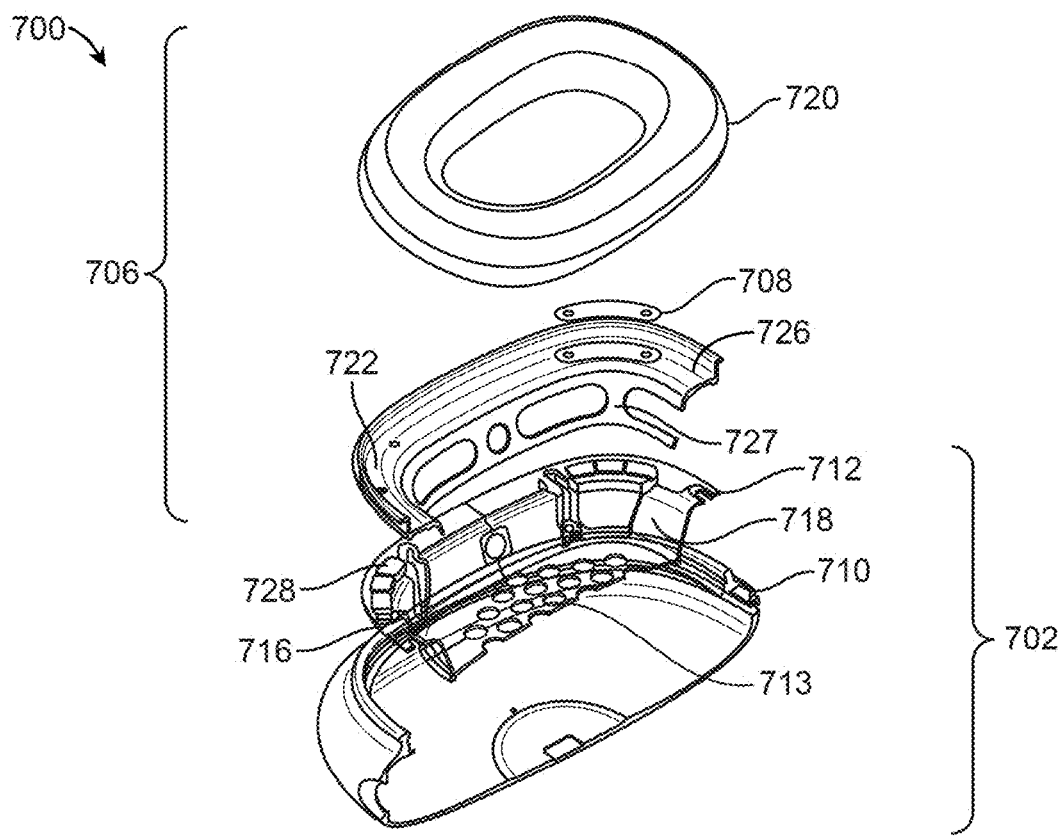
FIG. 7A shows a partial exploded view of an earpiece system according to some embodiments.

FIG. 7A shows a partial exploded view of an earpiece system 700 according to some embodiments. Earpiece system 700 incorporates an earpiece 702 (e.g., an implementation of ear cup 102 of FIG. 1) and a cushioning member 706 (e.g., an implementation of cushion 106 of FIG. 1). Earpiece 702 has a housing 710 and a cover 712 that attaches to housing 710. Cover 712 can have a peripheral annular shelf 716 and sidewall 718 surrounding a central recessed surface 713. Cover 712 can be made of plastic and/or other rigid materials. Cushioning member 706 includes an annular cushion element 720 and an annular frame 722 attached to cushion 720. Frame 722 can have a peripheral annular shelf 726 and a sidewall 727 shaped and sized such that frame 722 can nest in cover 712 with sidewall 727 of frame 722 abutting sidewall 718 of cover 712 and the underside of annular shelf 726 of frame 722 abutting the upper surface of annular shelf 716 of cover 712.

One or more attachment structures can be used to detachably couple (e.g., magnetically couple) cover 712 and frame 722 when the frame 722 is nested within cover 712. For example, when frame 722 has been positioned in cover 712, the securing mechanisms can prevent frame 722 from being removed until a certain force threshold has been reached. In various embodiments, the attachment structures can be or include multiple components that engage with one another to attach frame 722 to cover 712. For example, a "shunt" element 708, such as metallic plate, may be positioned in one or more corner regions of frame 722, and a magnet array 728 may be positioned in each corresponding region of cover 712. Shunt element 708 can be or include a magnet and/or a metallic plate that can be made of steel, iron, nickel, cobalt, stainless steel, aluminum, gold, and/or any other material that can magnetically couple with magnet array 728. Magnet array 728 can include one or more magnets, which can be permanent magnets made of ferromagnetic materials such as rare earth magnets (e.g., NdFeB magnets or the like). The magnets of magnet array 728 can have magnetic polarities oriented in specific directions. For example, the magnets can be arranged in a Halbach array (e.g., a rotating pattern of magnetic orientations), an alternating array (e.g., adjacent magnets have opposite magnetic orientations), and/or a single pole orientation (e.g., all magnets have the same magnetic orientation). Magnet array 728 can generate magnetic flux that can act on shunt element 708 to hold frame 722 in place when frame 722 is nested in cover 712. In some embodiments, a magnet array 728 can be positioned at each of four (rounded) corner regions of annular shelf 716. In some embodiments, magnet arrays 728 and/or shunt elements 708 can be arranged such that magnet arrays 728 exert sufficient force to hold frame 722 in place only when cushion 706 is inserted in a "correct" orientation. In embodiments where cushion 706 should be attached in a particular orientation, such an arrangement can aid the user in properly orienting the cushion.

Figure 7B:
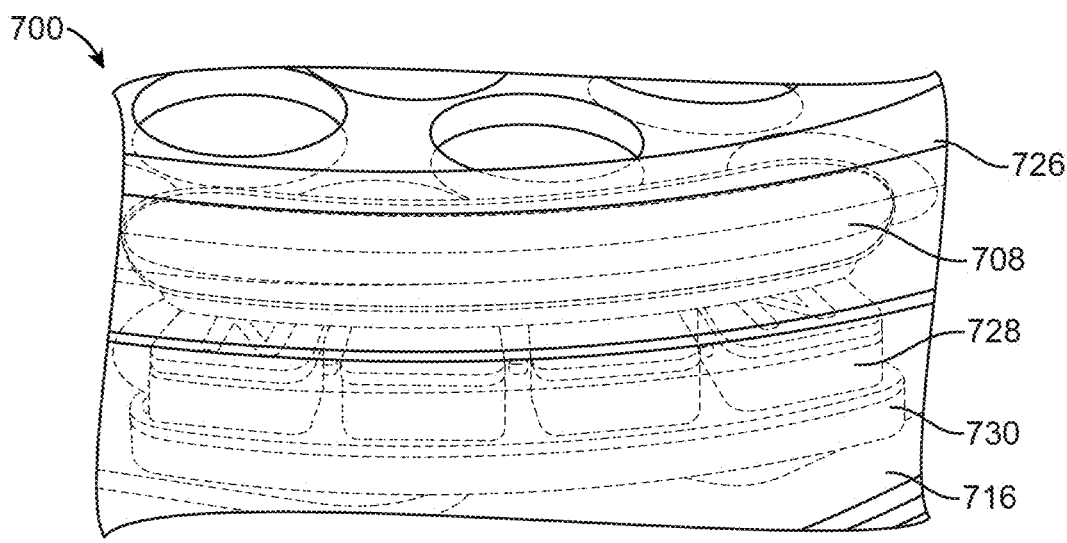
FIG. 7B shows a partially transparent view of a portion of an earpiece according to some embodiments.

FIG. 7B shows a partially transparent view of a portion of earpiece system 700 with frame 722 nested in cover 712, illustrating operation of the attachment mechanism. Shunt element 708 on annular shelf 726 of cushion 706 is proximate to magnet array 728 on annular shelf 716 of earpiece 702. In some embodiments, an additional metal shunt 730 can be positioned on cover 712 (e.g., between magnet array 728 and electronic components positioned within earpiece housing 710). Metal shunt 730 can prevent or reduce magnetic flux from magnet array 728 from interfering with electronic components contained in earpiece 702.

Figure 8A:
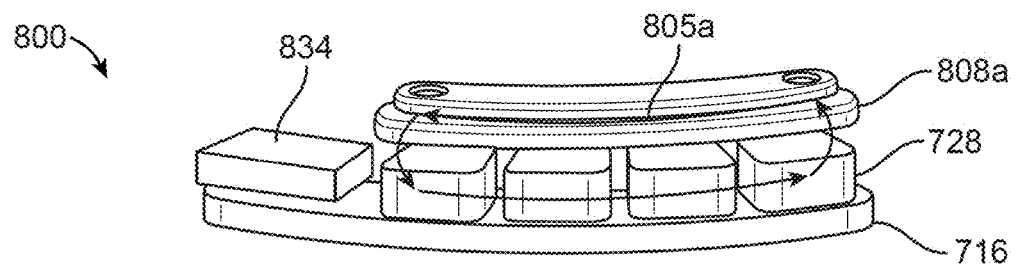
FIGS. 8A and 8B are simplified perspective views showing an example of magnetic cushion identification according to some embodiments.
Figure 8B:
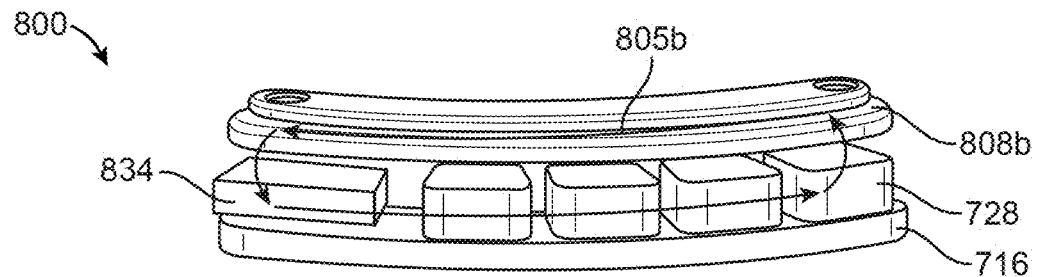

In some embodiments, magnet array 728 and shunt element 708 can be used to provide identification data for cushion 706. FIGS. 8A and 8B are simplified perspective views showing an example of magnetic cushion identification according to some embodiments. An identification system 800 includes magnet array 728 disposed on a portion of annular shelf 716 of cover 712 (as shown in FIG. 7A). A tag sensor 834 is disposed on annular shelf 716 adjacent to magnet array 728. Tag sensor 834 can be, for example, a Hall effect sensor or other sensor capable of detecting magnetic flux from magnet array 728.

An identification tag to distinguish different types of cushions 704 can be provided by varying the size and/or shape of shunt element 708. FIG. 8A shows a first shunt element 808a that can be used to indicate a first cushion type, and FIG. 8B shows a second shunt element 808b that can be used to indicate a second cushion type. As shown in FIG. 8A, when a cushion having first shunt element 808a becomes attached to magnet array 728, magnetic flux (indicated by looping arrows 805a) is shunted away from tag sensor 834. As shown in FIG. 8B, when a cushion having second shunt element 808b becomes attached to magnet array 728, magnetic flux (indicated by looping arrows 805b) is shunted through tag sensor 834. Accordingly, tag sensor 834 can produce a different signal depending on whether first shunt element 808a or second shunt element 808b is present. Thus, shunt elements 808a, 808b can provide an identification data encoding scheme that distinguishes two cushion types.

Figure 9A:
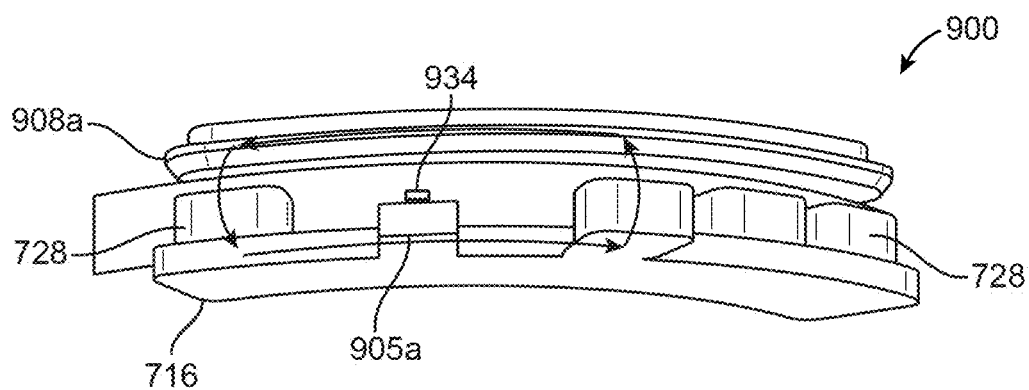
FIGS. 9A and 9B are simplified perspective views showing another example of magnetic cushion identification according to some embodiments.
Figure 9B:
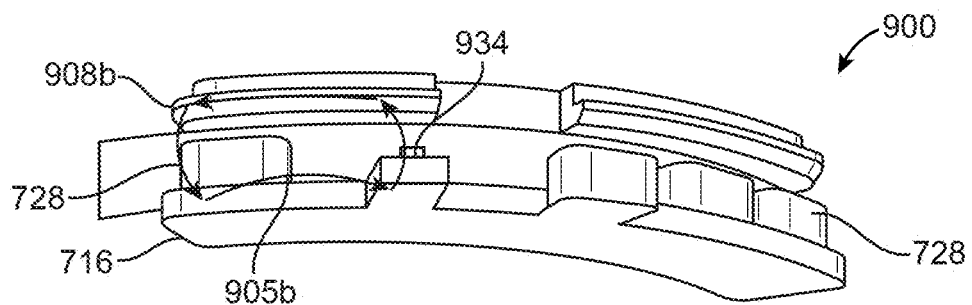

FIGS. 9A and 9B are simplified perspective views showing another example of magnetic cushion identification according to some embodiments. An identification system 900 includes magnet array 728 disposed on a portion of annular shelf 716 of cover 712 (as shown in FIG. 7). A tag sensor 934 is disposed on annular shelf 716 between magnets of magnet array 728. Tag sensor 934 can be, for example, a Hall effect sensor or other sensor capable of detecting magnetic flux from magnet array 728.

An identification tag for a particular cushion 704 can be provided by varying the size and/or shape of a shunt element. FIG. 9A shows a first shunt element 908a that can be used to indicate a first cushion type, and FIG. 9B shows a second shunt element 908b that can be used to indicate a second cushion type. As shown in FIG. 9A, when a cushion having first shunt element 908a becomes attached to magnet array 728, magnetic flux (indicated by looping arrows 905a)

is shunted around tag sensor 934. As shown in FIG. 9B, when a cushion having second shunt element 908*b* (which is split at a location 910 along its length) becomes attached to magnet array 728, magnetic flux (indicated by looping arrows 905*b*) is shunted through tag sensor 934. Accordingly, tag sensor 934 can produce a different signal depending on whether first shunt element 908*a* or second shunt element 908*b* is present. Thus, shunt elements 908*a*, 908*b* can also provide an identification data encoding scheme that distinguishes two cushion types.

In the examples of FIGS. 8A-8B and 9A-9B, two types of cushions can be distinguished based on whether magnetic flux is shunted away from or through tag sensor 834 or tag sensor 934. In some embodiments, it may be desirable to increase the number of cushion types that can be distinguished. To increase the number of cushion types that can be distinguished, some embodiments can include multiple instances of magnet array 728 (e.g. one instance at each corner of earpiece 702), with each instance of magnet array 728 having an associated tag sensor (e.g., tag sensor 834 or tag sensor 934). Each tag sensor can provide one bit of information, depending on whether the corresponding shunt element shunts the magnetic flux through or away from that sensor. The shapes of the various instances of shunt element 708 can be varied independently of each other. Accordingly, if there are N instances of magnet array 728 and N instances of shunt element 708, then N bits of identification data can be provided, allowing 2ᶰ cushion types to be distinguished. In another approach, each instance of magnet array 728 can include multiple tag sensors disposed between adjacent magnets, and shunt element 708 can be split or not split (as shown in FIGS. 9A-9B) at various locations, so that a single shunt element can encode multiple bits of information. These two approaches can be combined, with multiple magnet arrays each having multiple tag sensors, to further increase the number of cushion types that can be distinguished.

Figure 10:
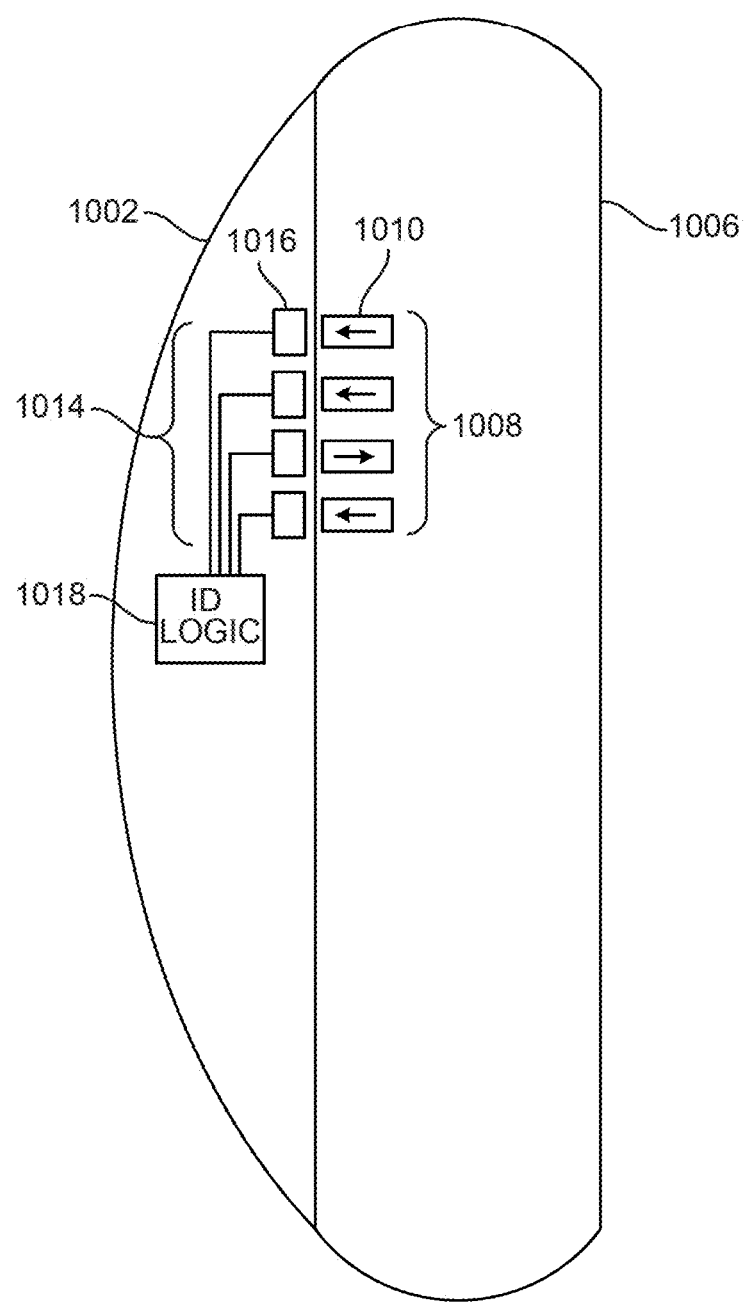
FIG. 10 shows a simplified cross-section view of an ear cup and cushion incorporating magnetic cushion identification according to some embodiments.

In some embodiments, a magnet array may be included in a cushion in addition to or instead of in an earpiece. FIG. 10 shows an example of a cushion 1006 according to some embodiments that includes a magnet array 1008. Magnet array 1008 includes a number of individual permanent magnets 1010 (or regions of ferromagnetic material), each having a specific magnetic orientation (indicated by arrows). Ear cup 1002 can have a tag sensor 1014 that includes an array of Hall effect sensors 1016. Hall effect sensors 1016 can be positioned such that they are adjacent to magnet array 1008 when cushion 1006 is attached to ear cup 1002. The pattern of magnetic orientations of magnet array 1008 can encode cushion identification data. Hall effect sensors 1016 can respond to the magnetic orientations, enabling ID logic 1018 to extract identification data from the pattern of magnetic orientations. In some embodiments, each magnet 1010 can encode one bit of identification data. Thus, an identification tag for a cushion can include a magnet array, and the corresponding tag sensor can include sensors to detect a pattern of magnetic orientation for the magnet array.

It will be appreciated that the foregoing examples of magnetic-based identification of a cushioning member are illustrative and that variations and modifications are possible. Magnetic-based identification can be implemented in any earpiece system where the cushioning member is magnetically attached to the earpiece, including cushions attached to ear cups and ear tips attached to earbuds. Further, magnetic features similar to those described above can be provided for purposes of identifying the cushioning member, regardless of whether magnetic attachment structures are used.

2.3. RF-Based Identification

Another proximity-based identification technique that can be leveraged according to some embodiments is near-field communication or radio-frequency identification. In some embodiments, an identification tag in a cushioning member can include a passive near-field communication (NFC) or radio-frequency identification (RFID) tag encoded with the identification data. A corresponding tag sensor can incorporate a compatible NFC or RFID coil coupled to circuitry implementing an NFC or RFID tag reader. As used herein, the terms "NFC" and "RFID" refer generally to communication protocols that use a "reader" circuit to generate a time-varying electromagnetic field in a first antenna (e.g., a first coil) and to sense fluctuations in the field due to a passive "tag" circuit coupled to a second antenna (e.g., a second coil) that is placed in near-field range of the first coil. Various protocols for NFC and RFID have been defined and may be used, or a custom protocol can be devised by persons skilled in the art.

Figure 11:
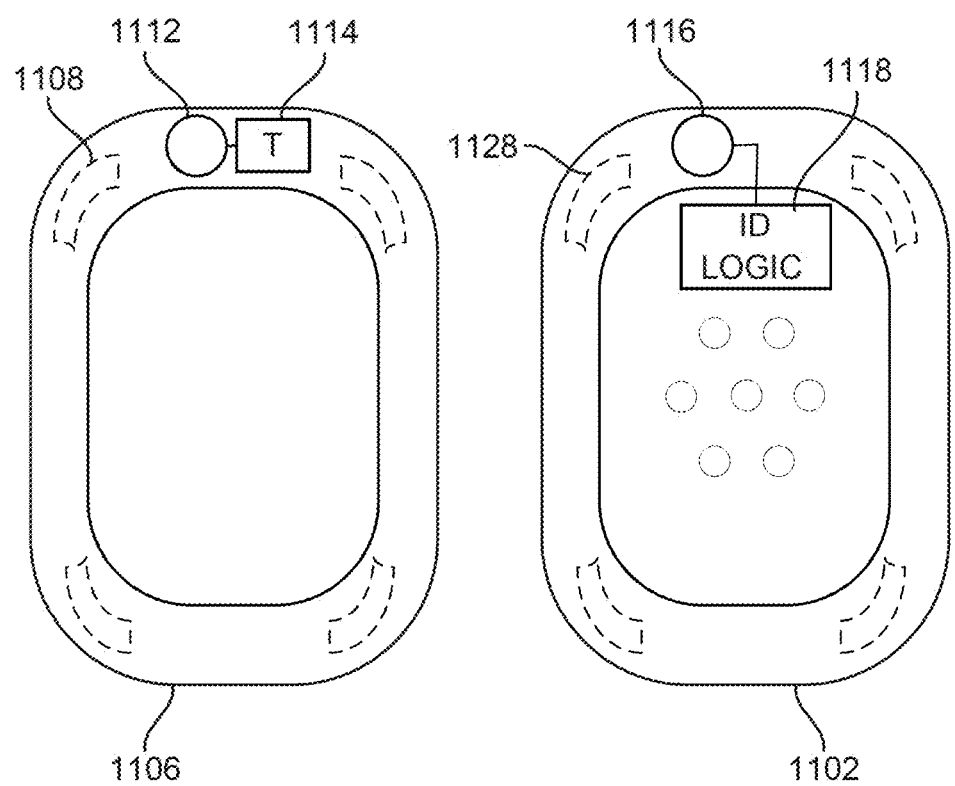
FIG. 11 shows a simplified view of an ear cup and cushion incorporating NFC circuits according to some embodiments.

FIG. 11 shows a simplified view of an ear cup 1102 and cushion 1106 according to some embodiments, incorporating an NFC reader. Ear cup 1102 can include magnet arrays 1128 disposed around the periphery. Cushion 1106 can include shunt elements 1108 disposed at locations corresponding to magnet arrays 1128 to enable cushion 1106 to be securely attached to earcup 1102. Magnet arrays 1128 and shunt elements 1108 can be similar to examples described above; however, magnet arrays 1128 and shunt elements 1106 need not support cushion identification. In other embodiments, mechanical or other attachment features can be used in addition to or instead of magnet arrays 1128 and shunt elements 1108.

Cushion 1106 can also include an NFC coil 1112 coupled to NFC tag circuit 1114 to provide a passive identification tag. Ear cup 1102 can include an NFC coil 1116 (a tag sensor) coupled to ID logic circuit 1118, which can include an NFC reader circuit. In some embodiments, the NFC coils and circuits can conform to existing NFC standards and can be of conventional design. When cushion 1106 is attached to ear cup 1102, NFC coil 1112 is brought into proximity with NFC coil 1116. ID logic circuit 1118 can be triggered to supply current to NFC coil 1116, thereby stimulating NFC coil 1112 and tag circuit 1114 and enabling ID logic circuit 1118 to read data stored in tag circuit 1114. Any NFC or RFID protocol can be used to store and communicate data from tag circuit 1114 to ID logic circuit 1118.

Figure 12A:
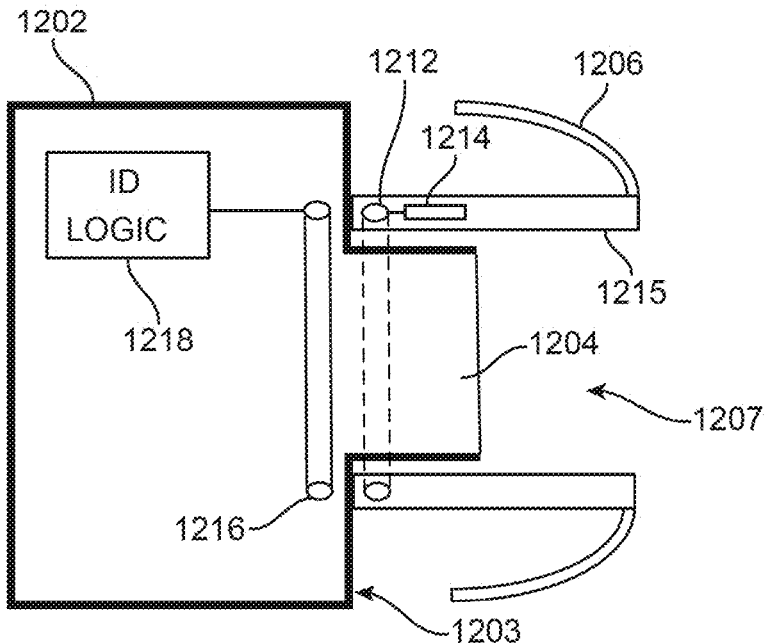
FIGS. 12A and 12B show a simplified cross-section view of an earbud and ear tip incorporating NFC circuits according to various embodiments.
Figure 12B:
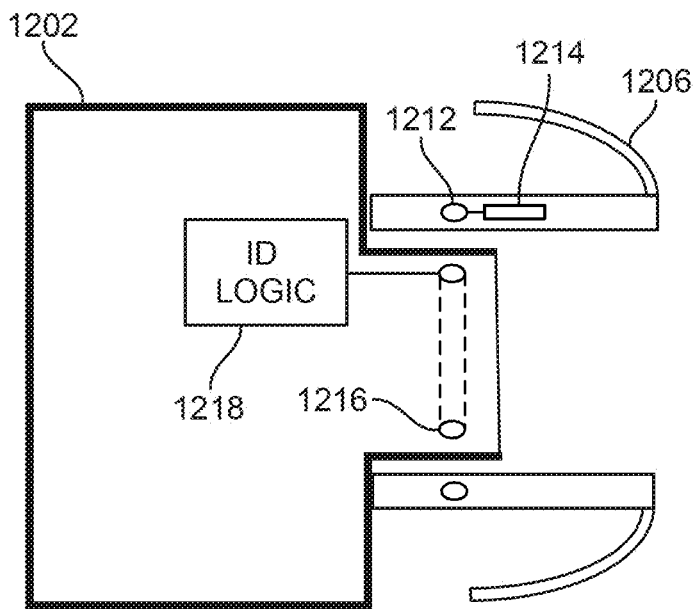

NFC identification (or other RFID-based identification) can also be implemented in an earbud and ear tip. FIG. 12A shows a simplified cross-section view of an earbud 1202 and ear tip 1206 according to some embodiments. Earbud 1202 and ear tip 1206 can be similar to earbud 402 and ear tip 1206 of FIG. 4C, with the identification tag and tag sensor implemented using NFC technologies. Earbud 1202 can include an NFC coil 1216 (a tag sensor) disposed adjacent to proximal surface 1203 surrounding end portion 1204. NFC coil 1216 can be coupled to an ID logic circuit 1218 that incorporates NFC reader circuitry. Ear tip 1206 can include an NFC coil 1212 disposed within annular sidewall 1215 surrounding central opening 1207. NFC coil 1212 can be coupled to an NFC tag circuit 1214 disposed within sidewall 1215. NFC tag circuit 1214 can encode identification data for ear tip 1206. In some embodiments, the NFC coils and circuits can conform to existing NFC standards and can be of conventional design. When ear tip 1206 is attached to earbud 1202, NFC coil 1212 is brought into proximity with NFC coil 1216. ID logic circuit 1218 can be triggered to supply current to NFC coil 1216, thereby stimulating NFC coil 1212 and tag circuit 1214 and enabling ID logic circuit 1218 to read data stored in tag circuit 1214. Any NFC or RFID protocol, including conventional protocols, can be used to store and communicate data from tag circuit 1214 to ID logic circuit 1218. FIG. 12B shows an alternative arrangement for NFC coils in which NFC coil 1216 in earbud 1202 and NFC coil 1212 in ear tip 1206 are arranged concentrically. Other arrangements are also possible, provided that when ear tip 1206 is positioned around front portion 1204 of earbud 1202, the NFC coils are brought into sufficient proximity to enable reading of the data stored in NFC tag 1214.

It will be appreciated that the NFC-based identification tags and reader circuitry are illustrative and that variations and modifications are possible. The particular arrangement and geometry of the coils can be modified. Depending on the particular construction and communication protocol, an NFC or RFID tag circuit (e.g., tag circuit 1114 or tag circuit 1214) can store multiple bytes or even kilobytes of information, which can support a very large number of unique identifiers of cushion types. In some embodiments, an ID tag can encode a unique identifier for an individual cushion (or pair of cushions).

2.4. Identification Using Resonant Circuits

Some NFC or RFID protocols allow a tag circuit to encode large amounts of data. In some embodiments, it may be desirable to distinguish a smaller number of cushion types, and a simplified NFC or RFID protocol can be used. For example, a reader circuit may include a small number of resonant coils that can each be stimulated to detect presence or absence of a nearby metal element; an ID tag can encode identification data in a pattern of metal elements.

Figure 13A:
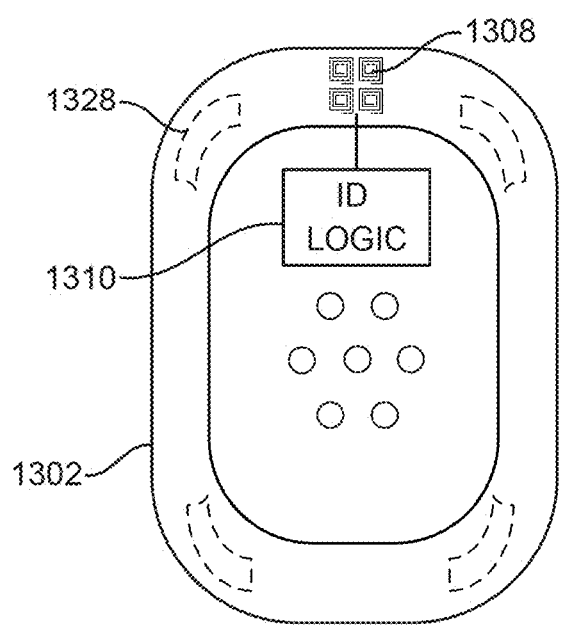
FIG. 13A shows a simplified view of an earcup incorporating a sensor coil array according to some embodiments.
Figure 13B:
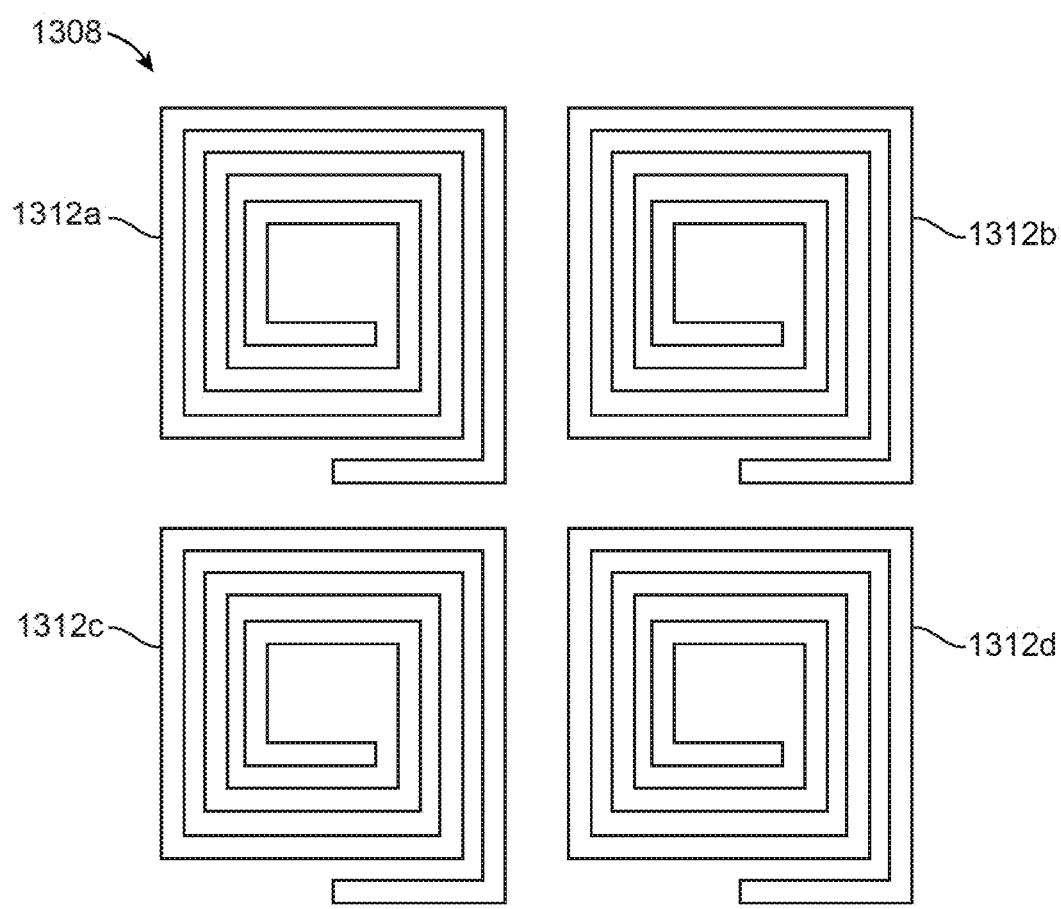
FIG. 13B shows a more detailed view of a layout of the sensor coil array.

FIG. 13A shows a simplified view of an earcup 1302 incorporating an RFID sensor according to some embodiments. Earcup 1302 can be similar to other earcups described above and can include attachment elements 1328 for attaching a cushion. A coil array 1308 (implementing a tag sensor) can be disposed within ear cup 1302, adjacent to the surface to which the cushion is to be attached. Coil array 1308 can include an array of sensor coils coupled to ID logic circuit 1310. FIG. 13B shows a more detailed view of a layout of coil array 1308 according to some embodiments. Coil array 1308 can include a number of separate coils 1312a-1312d. While four coils arranged in a 2×2 array are shown, it will be appreciated that any number and arrangement of coils can be used. It should be understood that the resonance properties of each of coils 1312a-1312d can be affected by placing a conductive object or non-conductive object adjacent to that coil 1312a-1312d.

Figure 13C:
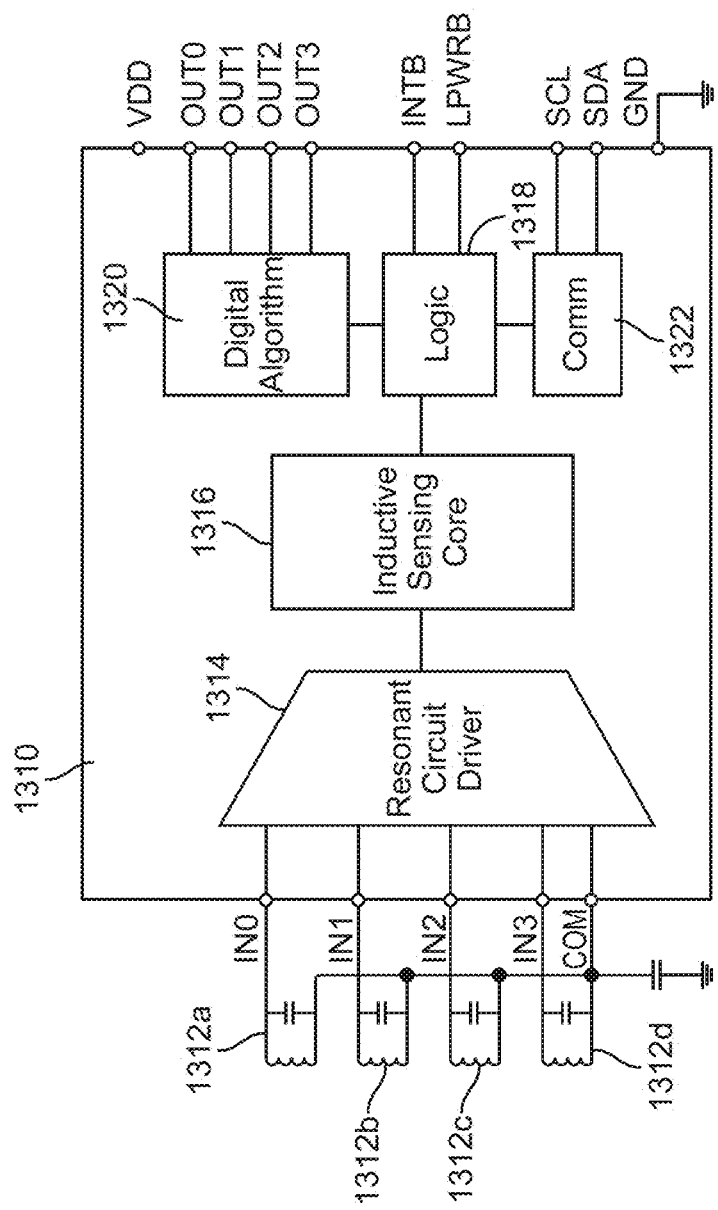
FIG. 13C shows a schematic circuit diagram of a sensor coil array and ID logic circuit according to some embodiments.

FIG. 13C shows a simplified schematic circuit diagram of coil array 1308 and ID logic circuit 1310 according to some embodiments. Each coil 1312a-1312d is represented as an equivalent circuit having an inductor and a capacitor. Coils 1312a-1312d are coupled to a resonant circuit driver 1314 and an inductive sensing core 1316. Resonant circuit driver 1314 can be operated to drive each coil 1312a-1312d at various frequencies, and inductive sensing core 1316 can sense the response. Based on signals produced by inductive sensing core 1316, a logic module 1318 can determine whether a conductive object is present or absent adjacent to each coil, and a digital encoding module 1320 can generate a four-bit digital output based on the output of logic module 1318. The four-bit output can include, for example, a bit corresponding to each of coils 1312a-1312d, with value "1" indicating that a conductive object is present and value "0" indicating that a conductive object is absent. A communication interface 1322 (e.g., implementing I²C or other standard communication protocols) can receive control signals to control operation of ID logic circuit 1310.

Figure 14:
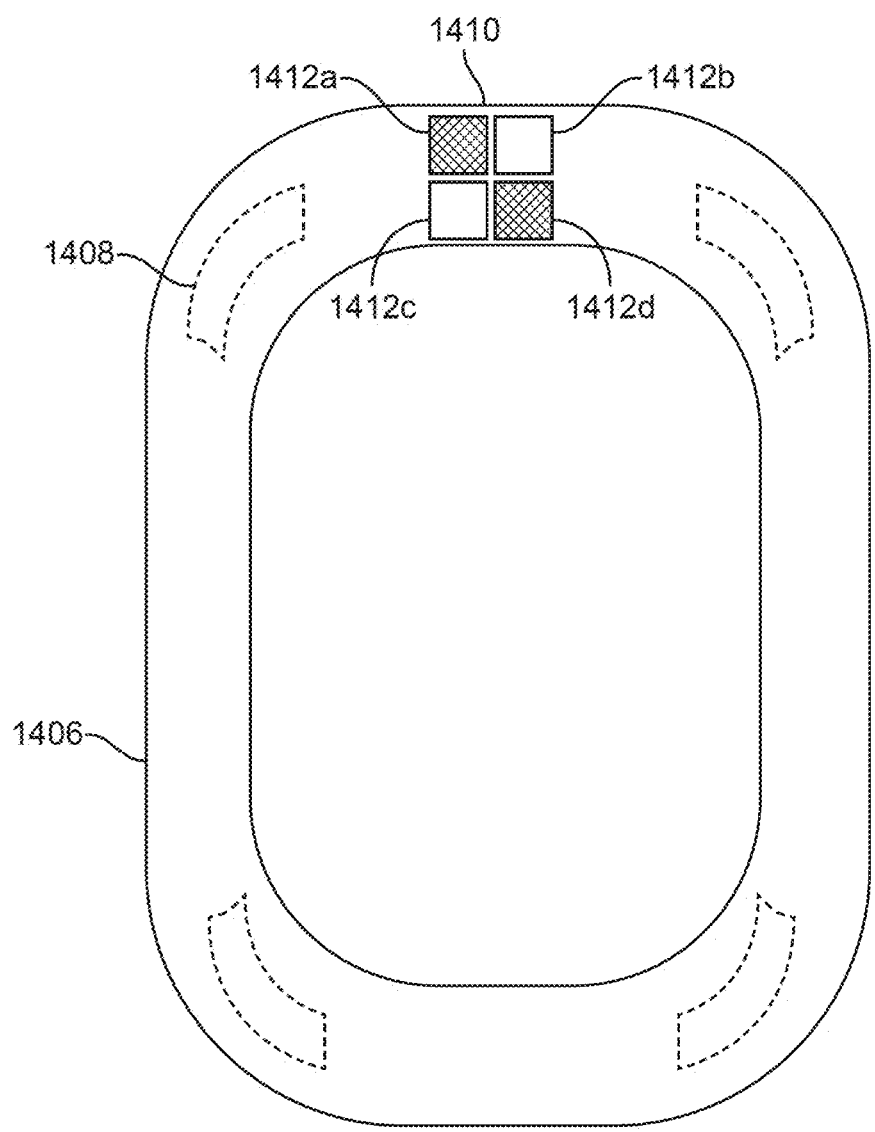
FIG. 14 shows a simplified view of a cushion incorporating a tag element readable using a sensor coil array according to some embodiments.

Cushions designed for identification by coil array 1308 can include an arrangement of conductive areas encoding a four-bit identifier. For example, FIG. 14 shows a simplified view of a cushion 1406 according to some embodiments. Cushion 1406 can include attachment elements 1408 that enable attachment to attachment elements 1328 of ear cup 1302 of FIG. 13A. Tag element 1410 can be positioned on or beneath the surface of cushion 1406 that abuts ear cup 1302. Tag element 1410 can include four demarcated areas 1412a-1412d, and identification data for the cushion can be represented by an appropriate pattern of conductive plates across the four areas. In the example shown in FIG. 14, areas 1412a and 1412d have conductive plates while areas 1412a and 1412d do not have conductive plates. Different patterns can be used to distinguish different cushion types.

Figure 15:
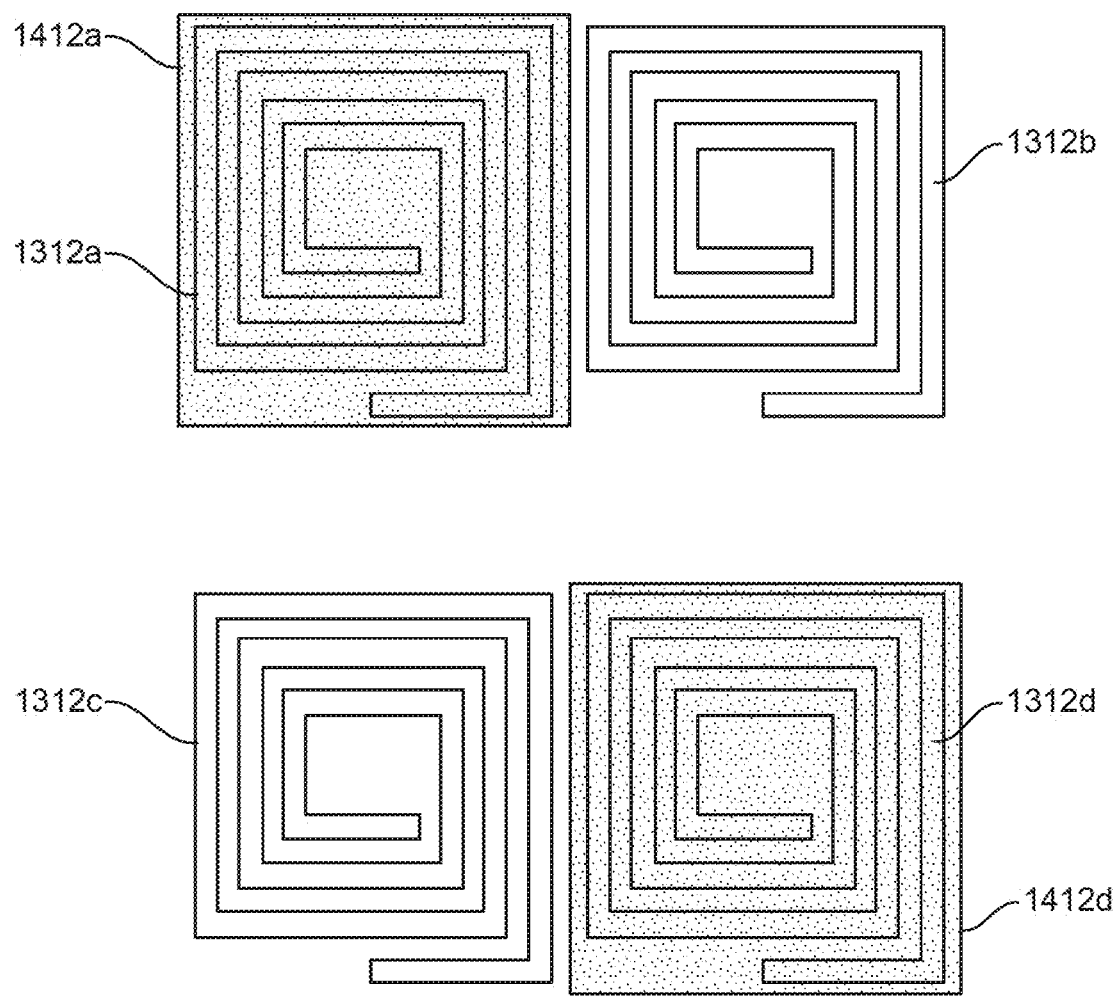
FIG. 15 shows a more detailed view of a tag element overlying a sensor coil array according to some embodiments.

FIG. 15 shows tag element 1410 overlying coil array 1308 according to some embodiments. Coils 1312a and 1312d align with areas 1412a and 1412d of tag element 1410, which have overlying conductive plates, while coils 1312b and 1312c align with areas 1412b and 1412c, which do not have overlying conductive plates. Accordingly, ID logic circuit 1310 can generate an identification pattern, e.g., "1001." A different arrangement of conductive plates can produce a different identification pattern, allowing different cushion types to be distinguished.

The resonant coil arrangement of FIG. 15 is illustrative and variations and modifications are possible. Resonant coil arrays can be implemented in a variety of form factors and arrangements. Further, while a resonant coil array is illustrated in the context of an ear cup and cushion, it should be understood that a similar principle can be applied to earbuds and ear tips, although space constraints may limit the number of coils. In some embodiments, a tag sensor using an array of N resonant coils can support identifiers for 2N types of cushions.

Figure 16:
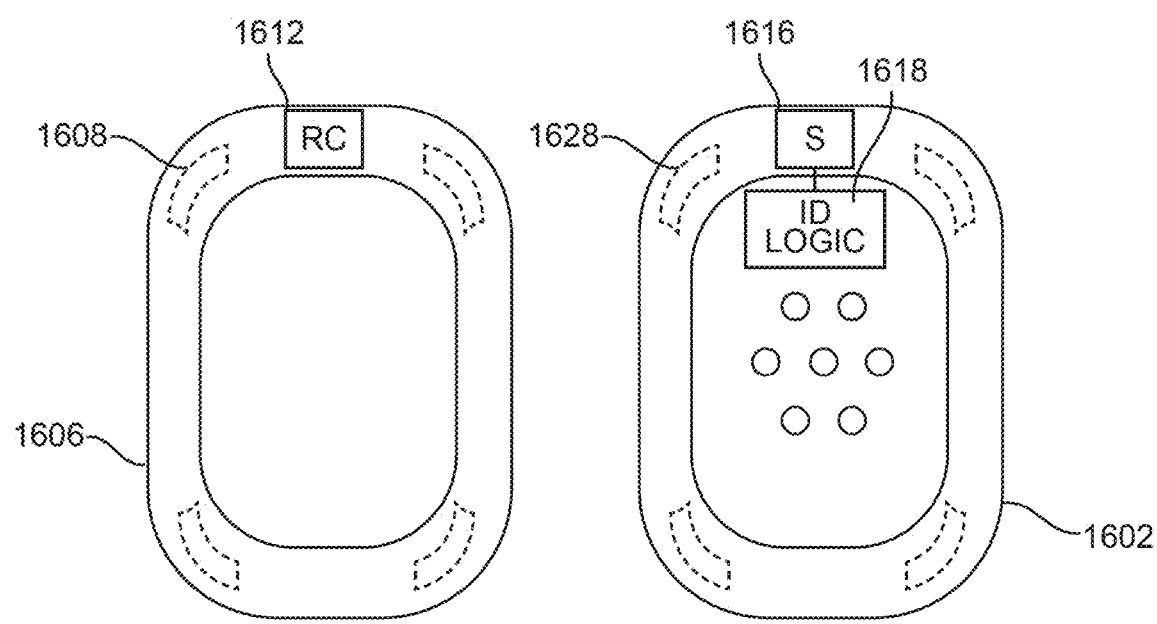
FIG. 16 shows a simplified view of an ear cup and cushion incorporating resonant-circuit-based identification according to some embodiments.

In the preceding example, each resonant circuit provides one bit of identification data. In other embodiments, a single resonant circuit can provide larger amounts of identification data. FIG. 16 shows a simplified view of an ear cup 1602 and cushion 1606 according to some embodiments, incorporating a resonant circuit for tag identification. Ear cup 1602 can include magnet arrays 1628 disposed around the periphery. Cushion 1606 can include shunt elements 1608 disposed at locations corresponding to magnet arrays 1628 to enable cushion 1606 to be securely attached to earcup 1602. Magnet arrays 1628 and shunt elements 1608 can be similar to examples described above; however, magnet arrays 1628 and shunt elements 1606 need not support cushion identification. In other embodiments, mechanical or other attachment features can be used in addition to or instead of magnet arrays 1628 and shunt elements 1608.

Cushion 1606 can have a "tag" circuit 1612 disposed at a particular location. Ear cup 1602 can have a tag sensor 1616 disposed at a location that is proximate to tag circuit 1612 when cushion 1606 is attached to ear cup 1602. Tag sensor 1616 can be coupled to ID logic circuit 1618, which can be disposed elsewhere within ear cup 1602.

Figure 17A:
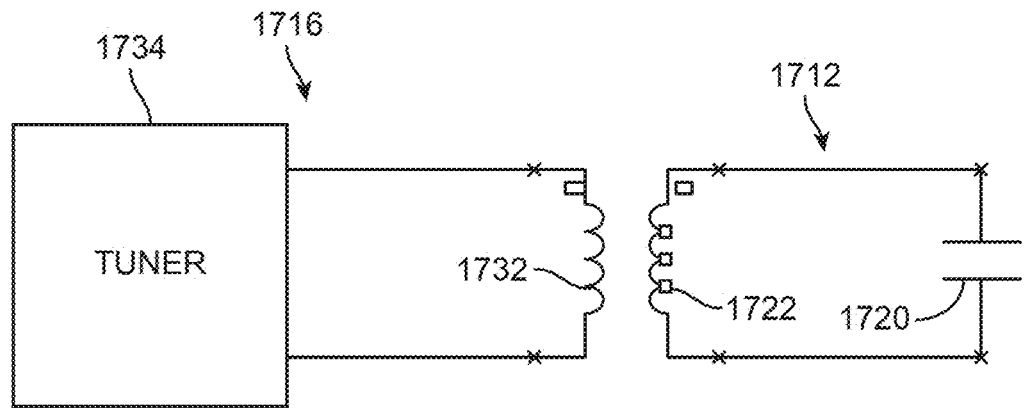
FIGS. 17A and 17B show examples of resonant circuits and reader circuits that can be used according to some embodiments.

Tag circuit 1612 can be a resonant circuit ("RC"), and ID logic circuit 1618 can incorporate tuner circuitry. In operation, ID logic circuit 1618 can drive tag sensor 1616 at various frequencies and detect the resonant frequency of tag circuit 1612. By way of example, FIG. 17A shows a resonant circuit 1712 and reader circuit 1716 according to some embodiments. Resonant circuit 1712 can implement tag circuit 1612. In this example, resonant circuit 1712 includes a capacitor 1720 and an inductor 1722 connected in a ring. Reader circuit 1716 can implement tag sensor 1616 and ID logic circuit 1618. In this example, reader circuit 1716 includes an inductor 1732 coupled to a tuner 1734. Resonant circuit 1712 and reader circuit 1716 can be arranged such that inductor 1722 is in proximity (at a fixed distance) to inductor 1732 when a cushion in which resonant circuit 1712 is present is attached to an ear cup in which reader circuit 1716 is present. Tuner 1734 can determine a resonant frequency, which depends on the inductance of inductor 1732, as well as the particular inductance of inductor 1722 and the particular capacitance of capacitor 1720. Accordingly, identification data for a cushion can be encoded in resonant circuit 1712 by configuring resonant circuit 1712 to have a resonant frequency assigned to a particular cushion type. In some embodiments, capacitor 1720 has the same (within manufacturing tolerance) capacitance for all cushion types, and cushion type information can be encoded by selecting the inductance of inductor 1722. In other embodiments, inductor 1722 can have the same inductance (again, within manufacturing tolerance) for all cushion types, and cushion type information can be encoded by selecting the capacitance of capacitor 1720. The number of cushion types that can be distinguished in this manner depends on the frequency range of tuner 1732 and the precision with which tuner 1732 can measure a particular resonant frequency. In some embodiments, a low-complexity tuner circuit can distinguish, e.g., up to about 10 different frequencies, each of which can be mapped to a particular value of a cushion identification parameter.

Figure 17B:
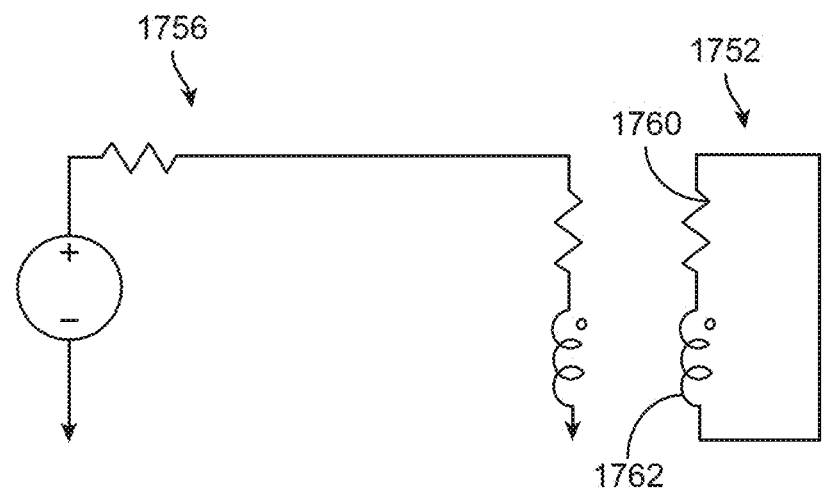

Other resonant circuit configurations can also be implemented. FIG. 17B shows another example of a tag circuit 1752 and tag sensor 1756 according to some embodiments. In this example, tag circuit 1752 includes a resistor 1760 and inductor 1762. Similarly to resonant circuit 1712 of FIG. 17A, identification data can be encoded in resonant circuit 1752 by configuring resonant circuit 1752 to have a resonant frequency assigned to a particular cushion type. In some embodiments, such configuration can be accomplished by varying either resistor 1760 or inductor 1762 while holding the other constant. Those skilled in the art will appreciate that numerous other resonant circuit configurations can be used.

It will be appreciated that the resonant circuit implementations shown herein are illustrative and not limiting. Further, while examples are shown in the context of identifying a cushion attached to an ear cup, similar techniques can be adapted for identifying an ear tip attached to an earbud or other types of cushioning members attached to an earpiece. As noted above, the number of distinct cushion types that can be identified using resonant circuits as ID tags depends on the ability of the sensor circuit to distinguish different resonant frequencies. To increase the number of distinct cushion types that can be identified, multiple resonant tag circuits and corresponding sensor circuits can be disposed at various locations around the cushion and ear cup, and different combinations of resonant frequencies of the tag circuits can be used to encode different cushion identifiers. For instance, if each reader circuit can distinguish a number M of different frequencies, and N tag/reader circuit combinations are present, then M*N cushion types can be distinguished.

2.5. Optical Identification

In some embodiments, an identification tag can include a region of material (e.g., plastic, metal, textile) disposed on the surface of a cushioning member that optically encodes identification data, and the tag sensor in the earpiece can include an active optical sensor that directs light (e.g., infrared light) onto the optical identification tag and senses reflected light from the optical identification tag. The amount of identification data encoded can vary depending on the particular sensor and encoding scheme. In the simplest case, cushions made of two different textiles having different reflectivity can be distinguished using a binary optical sensor to provide one bit of identification data. In other embodiments, an optical sensor can distinguish multiple reflectivity levels, increasing the amount of identification data. In still other embodiments, an optical sensor may include an imaging sensor (or an array of sensors) that can detect a pattern of reflectivity across an area, and an arrangement of regions of high and low reflectivity on the surface of the cushioning member can be used to encode two or more bits of identification data.

Figure 18A:
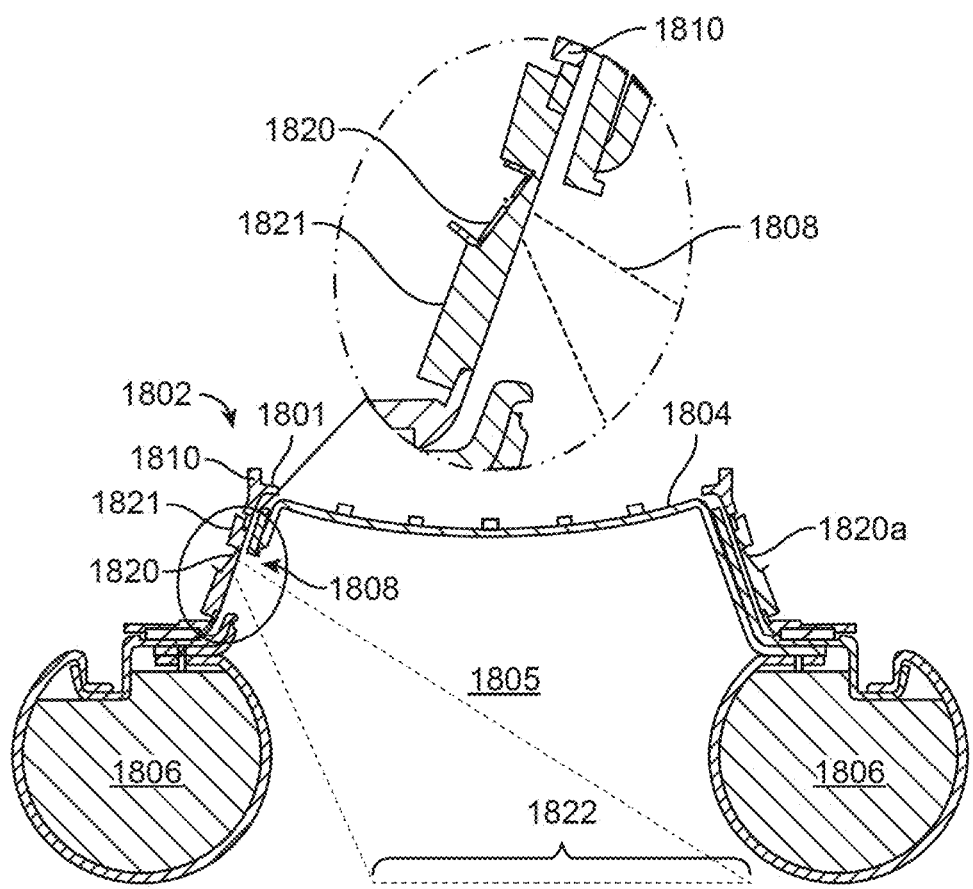
FIGS. 18A and 18B illustrate an arrangement for an optical sensor in an ear cup according to some embodiments.
Figure 18B:
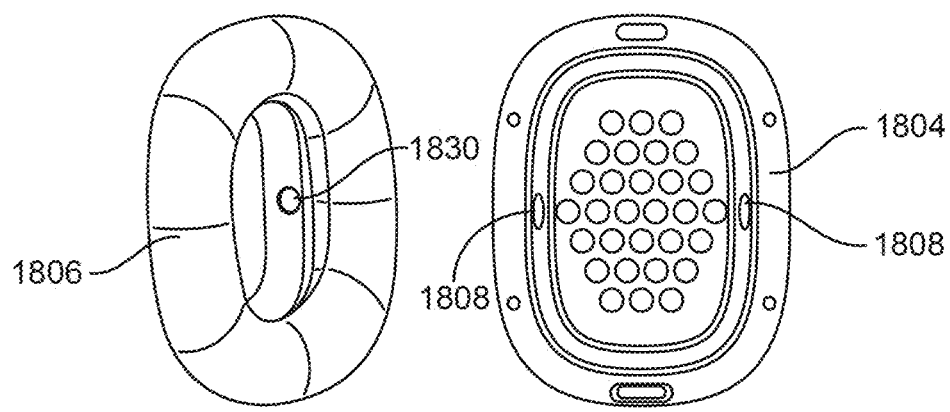

In some embodiments, an optical tag sensor can be provided by leveraging an optical sensor used to detect whether an earpiece is being worn. FIGS. 18A and 18B illustrate an arrangement for an optical sensor in an ear cup according to some embodiments. FIG. 18A shows a cross-section view of the front cover of an ear cup and an attached cushion, and FIG. 18B shows a perspective view of the front cover of the earcup and the cushion in a detached state. In the illustrated embodiment, an optical sensor is configured to detect whether an ear cup is on a user's ear.

Referring first to FIG. 18A, ear cup 1802 can include a housing 1801 (shown in part) and a cover 1804 attached to housing 1801. Cover 1804 can include multiple perforated holes to enable sound from a speaker positioned within housing 1801 to be directed out of housing 1801 toward a user's ear. An earpiece cushion assembly 1806 can be detachably attached to housing 1801 and cover 1802, e.g., using magnetic attachment as described above and/or mechanical attachment.

An optical sensor 1820 can be attached to housing 1801 (or to cover 1804) and oriented to detect a portion of a user (e.g., an ear of a user) positioned in a region 1805 within the inner periphery of ear cup 1802 and cushion assembly 1806. For example, sensor 1820 can have a field of view (FOV) 1822 (the area in which light is emitted from the sensor and the area in which the sensor can detect reflected light) that is a relatively wide cone to encompass a large region within region 1805 yet is confined to the inner periphery of the ear cup assembly. Sensor 1820 can be an electro-optical device that includes one or more emitters (e.g., one or more vertical cavity surface emitting lasers, VCSELs) and an optical receiver (e.g., an array of photo sensors). In some embodiments, sensor 1820 includes a single nanosecond-pulse VCSEL laser in the infrared wavelength range and a beam steering device that can direct the laser pulses at different individual fields of view within the larger FOV 1822 of sensor 1820.

In some embodiments, sensor 1820 further includes an array of single photon avalanche diodes (SPADs) as the receiver that can detect the reflected beams from within FOV 1822. When ear cup 1802 with attached cushion 1806 is placed on a user's head, sensor 1820 emits collimated beams of pulsed radiation at different locations within FOV 1822. The pulsed laser beams can reflect off of the user (e.g., off the user's ear or portion of the user's skull surrounding the ear) and be detected by the SPAD array optical receiver of sensor 1820. A processor or similar control circuit (not shown) within ear cup 1802 can be coupled to sensor 1820 to control the timing of the laser pulses and receive detection signals generated by the optical receiver. The processor can utilize the known timing of the laser pulses and other known information to determine the distance to the user's ear (or other reflected object) using time of flight calculation techniques. For example, the time of flight can be determined by emitting a beam of light at an object and measuring the time it takes a receiver to detect the light reflected off the object. In some embodiments, sensor 1820 can detect objects between approximately zero and at least approximately 300 mm away from sensor 1820. For example, sensor 1820 can detect objects positioned approximately 1 mm to approximately 100 mm away from sensor 1820.

Sensor 1820 can be electrically coupled to a processor for processing of the data detected by the SPAD array. The processor can determine if the intensity of the reflected light meets a certain threshold and if the distance of the object indicates it is within the region 1805. SPADs are highly sensitive devices that can detect radiation as small as a single photon in some instances. Because of the sensitivity of the SPAD optical receiver array and the ability of sensor 1820 to both detect an intensity of reflected radiation and determine a distance from the sensor to the object that the pulsed beams are reflected from, either or both of intensity or distance can be used to determine whether the ear cup assembly is on a user's head.

As shown in inset in FIG. 18A, sensor 1820 can be positioned behind an aperture 1808 formed in a sidewall portion 1810 of housing 1801 and cover 1804 to enable sensor 1820 to both project radiation into region 1805 and receive radiation reflected from one or more surfaces within region 1805 back to the optical sensor.

In various embodiments, sensor 1820 can be positioned on a carrier 1821 that can couple with sidewall portion 1810 and span the width of aperture 1808. Carrier 1821 can provide a mounting angle to direct sensor 1820 such that FOV 1822 spans a desired area and avoids an undesired area (such as the surfaces of cushion 1806). Antireflective coatings and optically transparent windows can be used to further optimize performance of sensor 1820. In some embodiments, a second optical sensor 1820a can be positioned opposite sensor 1820.

FIG. 18B shows a perspective view of cover 1804 and cushion assembly 1806. Cover 1804 can include apertures 1808 as described above to allow passage of light from sensors 1820, 1820a. Cushion 1806 can include regions 1830 corresponding to the positions of apertures 1808 (one such region is visible in FIG. 18B; while the other is not shown, its location can be inferred). In some embodiments, one of opposing regions 2530 can be an aperture to facilitate detection of whether the ear cup is on the user's head using one of sensors 1820, 1820a, while the other of regions 1830 can be an opaque region that encodes identification data. Opaque region 1830 can be read by sensor 1820 or 1820a (depending on the orientation of cushion 1806 relative to earpiece 1804) to determine cushion-identifying information.

Figure 19A:
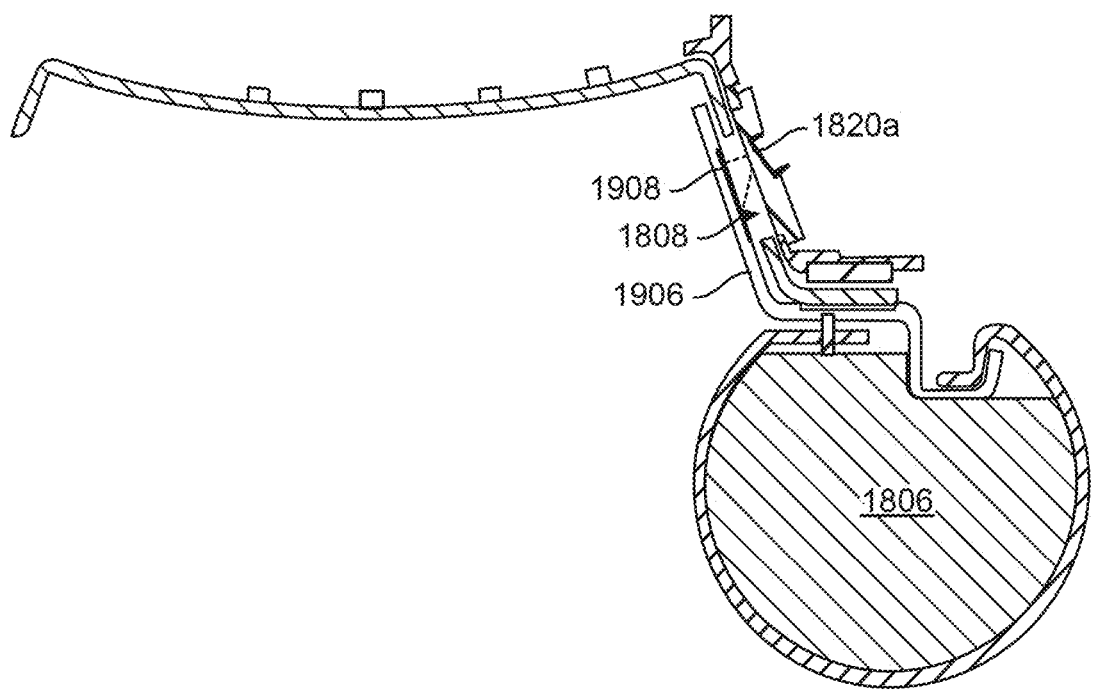
FIGS. 19A and 19B show examples of optical encoding of identification data in a cushion according to various embodiments.
Figure 19B:
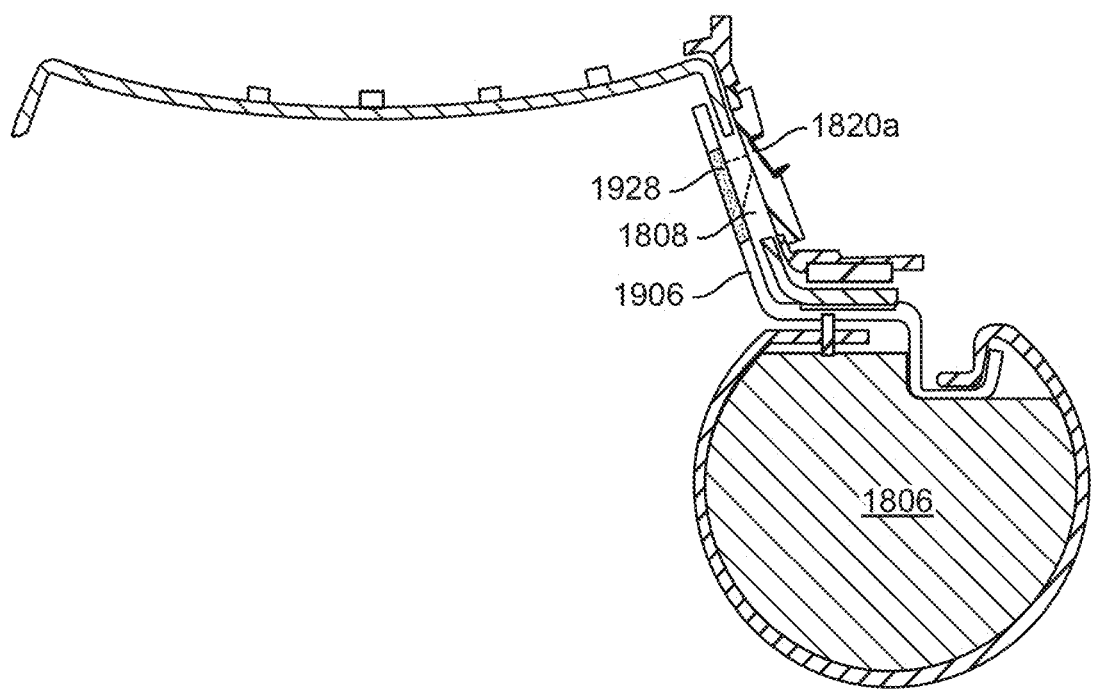

FIGS. 19A-19C show examples of encoding identification data into region 1830 of cushion 1806 according to various embodiments. As shown in FIG. 19A, detachable cushion 1806 can include a sidewall 1906 that extends over aperture 1808 such that a region of sidewall 1906 is exposed to optical sensor 1820a. Sidewall 1906 can have a target pattern 1908 printed on its surface within the exposed region such that target pattern 1908 can be detected by optical sensor 1820a. For example, to distinguish two cushion types, target pattern 1908 can be an area of high reflectivity for a first cushion type or an area of low reflectivity for a second cushion type, and sensor 1820a can use a threshold test to determine the cushion type. To distinguish a larger number of cushion types, multiple levels of reflectivity can be defined, with the upper limit based on the ability of sensor 1820a to reliably distinguish the levels. Alternatively, an imaging approach can be used where the printed pattern includes a fixed number of areas (or pixels), each of which has either high or low reflectivity, and sensor 1820a can interrogate each area (e.g., using an array of photosensors and/or beam steering techniques) to separately determine the reflectivity of each pixel. The number of pixels can be chosen based on the number of cushion types to be distinguished.

FIG. 19B shows another example of detachable cushion 1806 including a sidewall 1906 that extends over aperture 1808 such that a region of sidewall 1906 is exposed to optical sensor 1820a. In this example, a target pattern 1928 is injected into sidewall 1906, e.g., using a second-shot molding process with a material having the desired reflectivity. Similarly to the embodiment of FIG. 19A, two or more cushion types can be distinguished based on reflectivity levels and/or a pattern of high and low reflectivity areas within target pattern 1928.

It will be appreciated that the optical-sensor embodiments described herein are illustrative and that variations and modifications are possible. For example, multiple optical sensors can be disposed at various aperture locations around the sidewall of an ear cup, and identification data can be encoded using any or all of: presence or absence of cushion material over each aperture; reflectivity of the cushion material over each aperture; and/or a pattern of regions of different reflectivity at each aperture. The amount of identification data that can be encoded depends on the number of distinct regions and/or reflectivity levels that can be independently sensed by the optical sensor(s) in the ear cup. In some embodiments, particularly where the number of cushion types to be distinguished is small, the material of sidewall 1906 can itself encode the cushion-identifying information without affixing or injecting any other pattern. It should also be understood that similar techniques can be applied to an ear tip and earbud.

2.6. Acoustic Identification

In some embodiments, different cushion types may have different acoustic characteristics. Where this is the case, the cushion itself can encode identifying information, and acoustic techniques such as electromechanical impedance spectroscopy can be used to read the cushion identification data.

Figure 20:
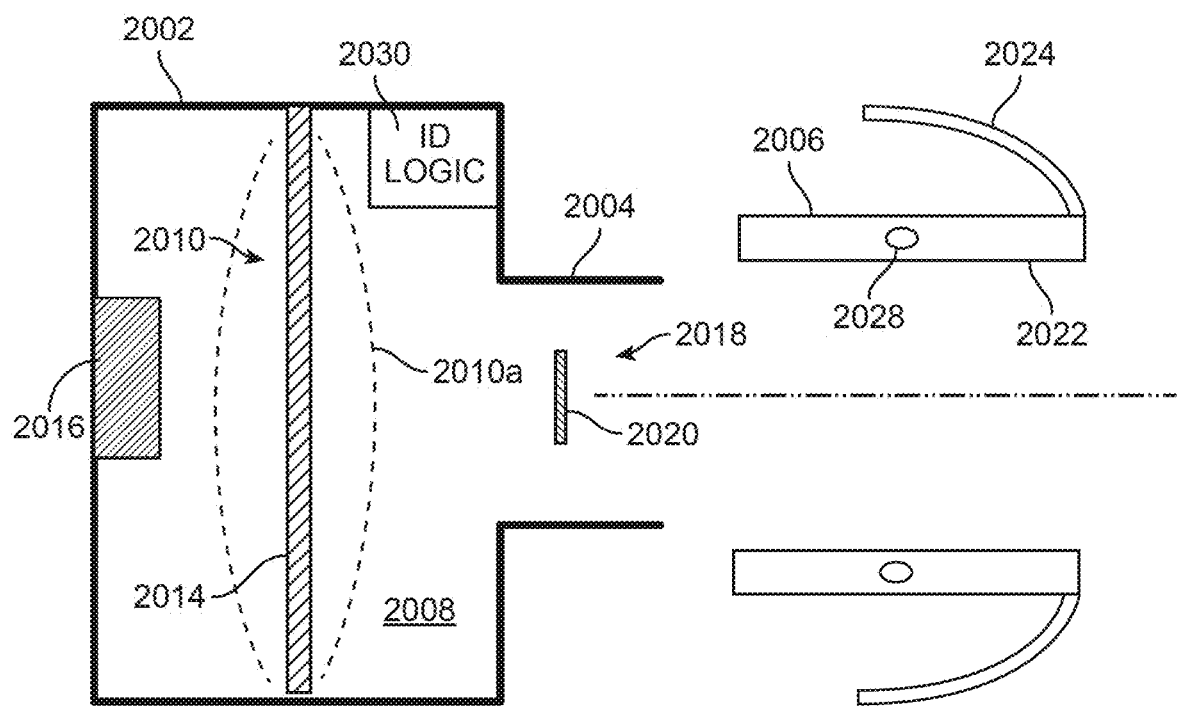
FIG. 20 shows an example of an earbud and ear tip according to some embodiments.

FIG. 20 shows an example of an earbud 2002 and ear tip 2006 according to some embodiments. Earbud 2002 defines an acoustic chamber 2008 and has an acoustic driver 2010. For example, driver 2010 can include a diaphragm 2014 that can be induced to oscillate by a transducer (not shown) coupled to an amplifier 2016. As diaphragm 2014 oscillates, as indicated by dashed line 2010a, air in acoustic chamber 2008 can be excited, producing sound waves that exit through an acoustic port 2018 (e.g., an opening) in front portion 2004. In some embodiments, a microphone 2020 can be placed within acoustic port 2018 to receive sound.

Similarly to embodiments described above, front portion 2004 can receive and attach to ear tip 2006. Ear tip 2006 has a sidewall 2022 that surrounds front portion 2004. As described above, various mechanical, magnetic or friction-based attachment structures can be used to detachably attach ear tip 2006 to earbud 2002. Ear tip 2006 can also have a compliant lobe or cap 2024 that can conform to a user's ear canal as described above. Ear tip 2006 can also include a tag element 2028 that can be disposed, e.g., within sidewall 2022. Tag element 2028 can incorporate passive circuitry, such as a metal band, a coil, a plate, or the like, that can provide resistance, capacitance, and/or inductance, depending on the particular configuration.

Figure 21:
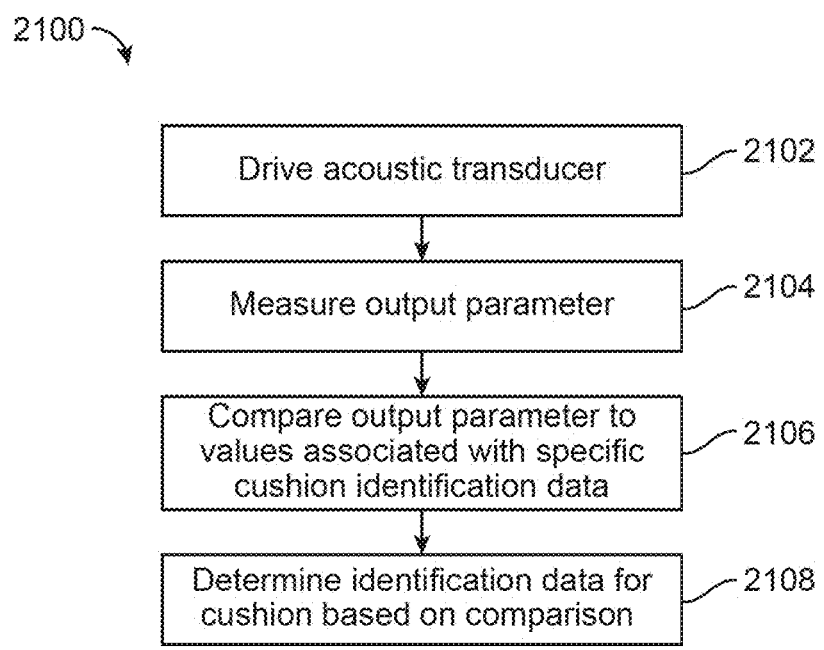
FIG. 21 shows a flow diagram of a process for acoustic identification according to some embodiments.

Earbud 2002 can also include ID logic 2030. ID logic 2030 can communicate with amplifier 2016 and microphone 2020 to perform acoustic identification of ear tip 2006. FIG. 21 shows a flow diagram of a process 2100 for acoustic identification that can be implemented in ID logic 2030 according to some embodiments. At block 2102, ID logic 2030 can drive an acoustic transducer at a target frequency. For example, ID logic 2030 can operate amplifier 2016 to drive diaphragm 2014. At block 2104, ID logic 2030 can measure an output parameter. For example, ID logic 2030 can receive a detected (acoustic) response from microphone 2020 and determine a load impedance on amplifier 2016. Alternatively, ID logic 2030 can incorporate a meter connected to amplifier 2016 to measure load impedance without relying on microphone 2020. At block 2106, ID logic 2030 can compare the measured output parameter to parameter values associated with specific cushion types, and at block 2108, ID logic 2030 can determine identification data for ear tip 2006 based on the comparison.

In some embodiments, multiple measurements can be used to determine the identification data. For example, ID logic 2030 can drive amplifier 2016 at a target frequency in each of a current-driven ("HOR") mode and a voltage-driven ("ZOR") mode. The acoustic response from microphone 2020 varies with load impedance in HOR mode but not in ZOR mode. Accordingly, the difference between acoustic responses from microphone 2020 in HOR and ZOR modes can provide a measurement of load impedance. The measurement can be repeated across a number of target frequencies to create a load impedance profile. The load impedance profile can be affected by the particular characteristics of tag element 2028, making it possible to distinguish ear tips of different types.

In some embodiments, a small amount of ear tip identifying information can be encoded in this manner. For example, it may be possible to detect whether an ear tip is present or absent based on the load impedance profile, which can be useful information, e.g., for earbuds that are designed to be used either with or without an ear tip. As another example, two or three configurations of tag element 2028 may be distinguishable based on load impedance profiles, and the configurations can be used to encode an ear tip size (e.g., small, medium, large or just small and large).

Depending on the frequencies used, ear tip identification using electromechanical impedance spectroscopy techniques may be audible to the user, which may not be desirable. To avoid or minimize audible sounds, some embodiments use ultrasonic frequencies (above the range of normal human hearing). Some embodiments can use frequencies within the range of human hearing, at amplitudes that are close to the noise threshold, with modulation or keying schemes to improve the signal quality.

It will be appreciated that this acoustic identification technique is illustrative and that variations and modifications are possible. A variety of different tag circuit configurations can be implemented, including circuits similar to those shown in FIGS. 17A and 17B. Acoustic identification techniques can also be applied to identification of cushions attached to ear cups. For example, cushions made of different materials may produce different frequency response profiles (e.g., bass response may be affected by the material composition of a particular cushion), and where this is the case acoustic spectroscopy can be used to distinguish different cushion types.

2.7. Capacitive Sensors

Another identification technique can be implemented in earpieces that have touch-sensitive interfaces. For example, some existing headphones and earbuds allow the user to touch specific areas on the exterior surface of an earpiece to adjust volume, start or stop music playback, answer or end a phone call, or control other operations. Touch-sensitive interfaces can be implemented using capacitive sensor logic that receives and interprets capacitance measurements from sensor points located in various areas on the surface of the earpiece.

In some embodiments, capacitive sensor logic can be leveraged to implement identification of a cushioning member attached to an earpiece. For example, in the embodiment of FIG. 5, ear cup 502 can have a touch-sensitive interface with sensor points disposed on external surface 501 (where a user can touch them while wearing ear cup 502). Additional sensor points for the touch-sensitive interface can be positioned on interface surface 503. Interface surface 507 of cushion 506, which contacts interface surface 503 of ear cup 502, can be patterned with surface deviations that encode identification data. When cushion 506 becomes attached to ear cup 502, the capacitive sensor logic in ear cup 502 can read the resulting pattern of signals from the sensor points on interface surface 503 and decode the identification data.

It should be understood that capacitive sensing can be used for ear tip identification in an earbud and more generally for cushioning member identification in any earpiece that is instrumented with a touch-sensitive interface. In some embodiments, a touch-sensitive interface can be implemented exclusively for cushioning member identification.

2.8. Electrical Contacts for Identification

The foregoing embodiments incorporate contactless identification tags, meaning that identification data can be communicated without an electrically conductive path connecting the ID tag and the tag sensor. Contactless D tags can be desirable in some instances, such as where moisture that may corrode electrical contacts may be a concern. In some embodiments, however, electrical contacts can be used to couple a tag sensor to an identification tag.

Figure 22:
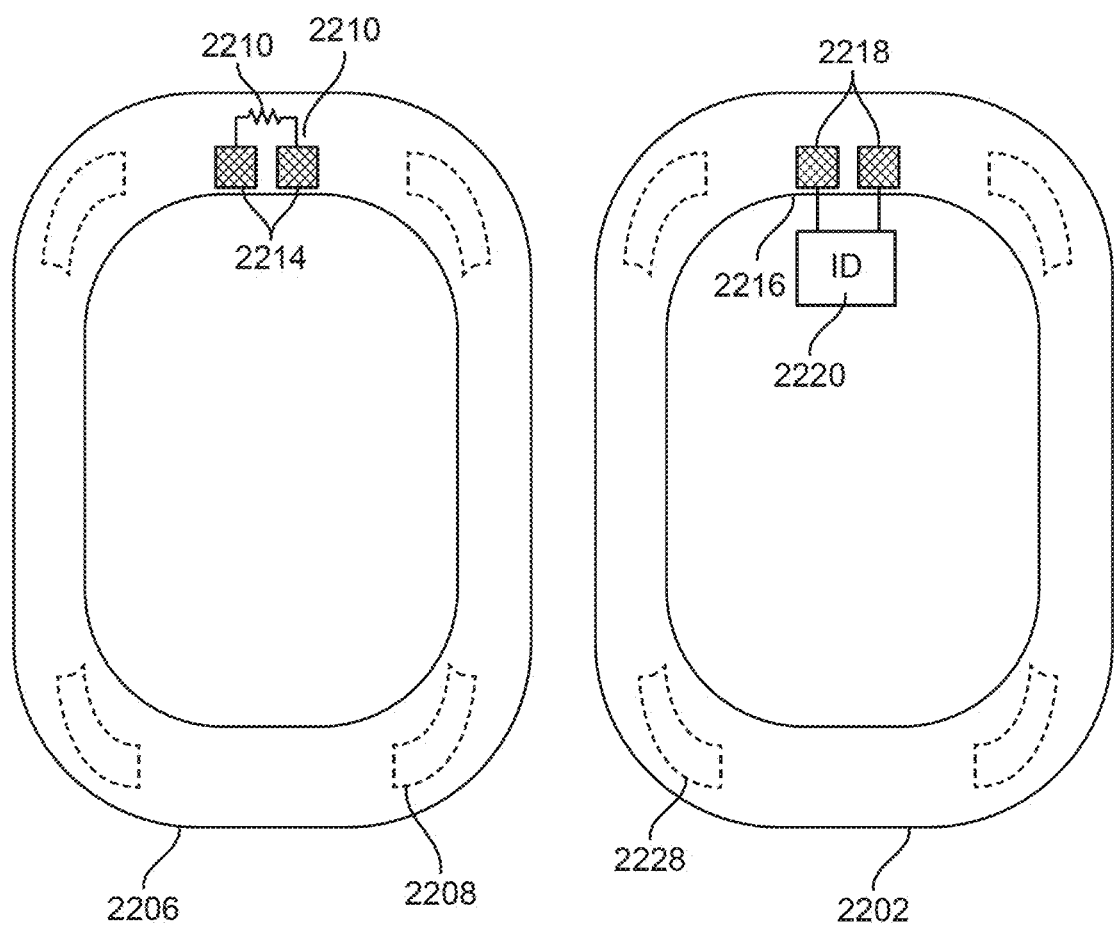
FIG. 22 shows a simplified view of an ear cup and cushion implementing resistance-based identification data according to some embodiments.

FIG. 22 shows a simplified view of an ear cup 2202 and cushion 2206 according to some embodiments. Cushion 2206 can be removably attached to ear cup 2202 using attachment structures 2208, 2228, which can be similar to other embodiments described above. Cushion 2206 also includes an identification tag 2210, which can be implemented using a resistor 2212 coupled between two electrical contacts 2214. Ear cup 2202 includes a tag sensor 2216 which can be implemented using electrical contacts 2218 coupled to an ID logic circuit 2220. When cushion 2206 is attached to ear cup 2202, electrical contacts 2214 and 2218 are in contact with each other, allowing current to flow. ID logic circuit 2220 can include circuitry usable to determine the resistance of resistor 2210 (e.g., a conventional voltage divider circuit or the like), and the resistance of resistor 2210 can provide identification data for cushion 2206. In these embodiments, the number of unique identifiers corresponds to the number of resistance values that can be distinguished. In some embodiments, the number of unique identifiers can be further increased by providing additional contacts and additional resistors, with the particular combination of resistors encoding the identification data.

Figure 23:
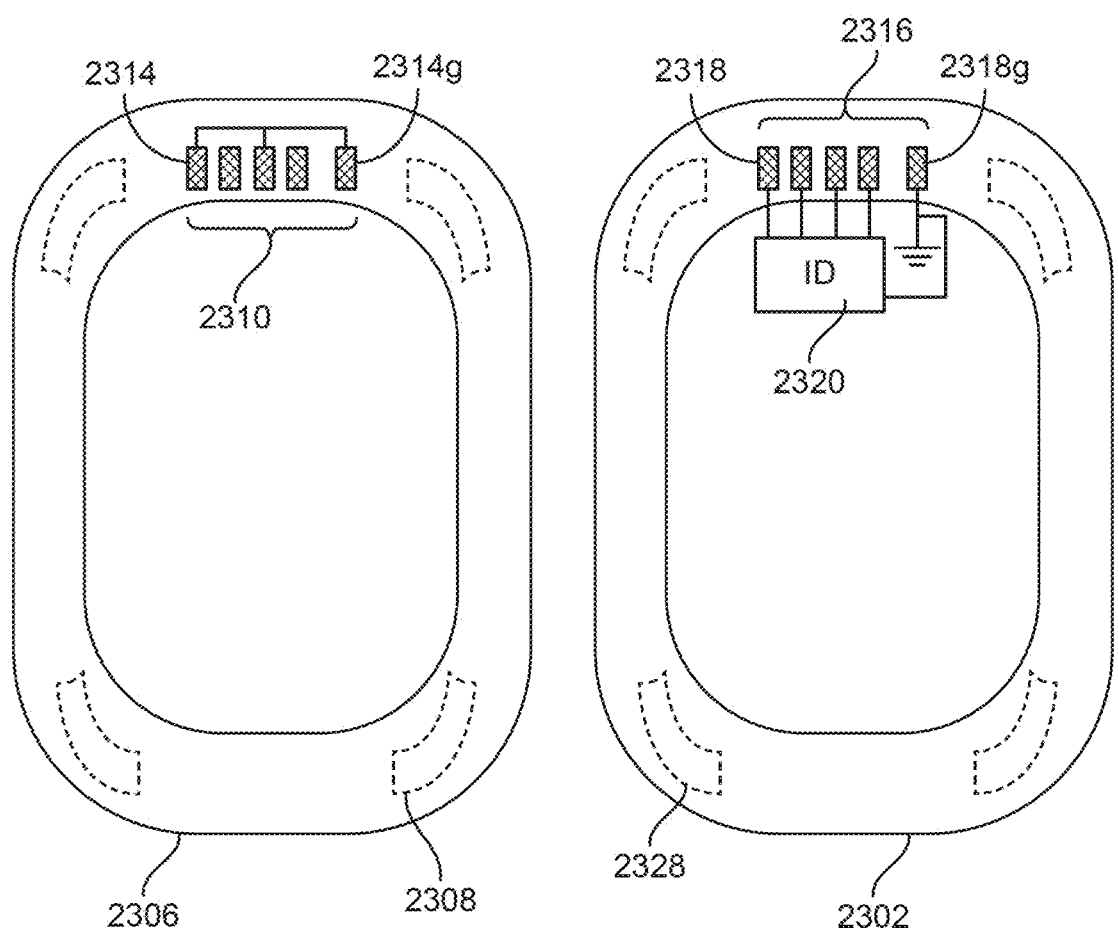
FIG. 23 shows a simplified view of an ear cup and cushion implementing contact-based identification data according to some embodiments.

As another example, FIG. 23 shows a simplified view of an ear cup 2302 and cushion 2306 according to some embodiments. Cushion 2306 can be removably attached to ear cup 2302 using attachment structures 2308, 2328, which can be similar to other embodiments described above. Cushion 2306 also includes an identification tag 2310, which can be implemented using a set of electrical contacts 2314. One electrical contact 2314g can be a designated ground contact, and some of the electrical contacts 2314 can be connected to ground contact 2314g while others are unconnected (floating). Ear cup 2302 includes a tag sensor 2316 which can be implemented using a set of electrical contacts 2318 coupled to an ID logic circuit 2320. Electrical contact 2318g can be grounded as shown. When cushion 2306 is attached to ear cup 2302, electrical contacts 2314 and 2318 are in contact with each other, allowing current to flow. Ground contact 2314g can be in contact with grounded contact 2318g so that ground contact 2314g is also grounded. ID logic circuit 2320 can include circuitry to determine whether each of electrical contacts 2318 is grounded (as would be the case if the corresponding one of electrical contacts 2314 is coupled to ground contact 2314g) or floating (as would be the case if the corresponding one of electrical contacts 2314 is not coupled to ground contact 2314g). The state of each contact (grounded or ungrounded) can provide one bit of identification data. If there are N active contacts 2314 (excluding ground contact 2314g), then 2N cushion types can be distinguished.

It will be appreciated that the foregoing examples of identification techniques using electrical contacts are illustrative and that variations and modifications are possible. Any number and arrangement of contacts can be provided. It should be understood that electrical contacts to enable communication of tag information can also be implemented in an ear tip and earbud or in any other type of cushioning member and earpiece.

2.9. Active Identification Tags

In the foregoing examples, the identification tag can be a passive element that does not require power or logic circuitry in the cushioning member. In other embodiments, an identification tag in a cushioning member (e.g., identification tag 108 of FIG. 1 or identification tag 208 of FIG. 2) can include an active element (e.g., a transceiver) that can communicate via a two-way communication channel with reader circuitry located in a corresponding earpiece (e.g., ear cup 102 of FIG. 1 or earbud 202 of FIG. 2). Depending on implementation, the communication channel can be wired or wireless. Where the identification tag is an active element, the identification tag can be configured to receive operating power from the earpiece, and the earpiece can be configured to supply operating power to the identification tag. For example, power contacts may be provided to transfer power from the earpiece to the identification tag. Alternatively, inductive power transfer can be used to provide power from the earpiece to the identification tag without requiring a wired connection. In some embodiments, an active identification tag may be supported in combination with additional active components within a cushioning member.

3. Processes for Identifying Cushioning Members 3.1. Identification Process Overview Referring again to FIG. 3, regardless of the particular implementation of identification tag 308 and associated tag sensor 314 and identification logic 334, an earpiece 302 (e.g., ear cup or earbud) can read the identification tag 308 of a cushioning member 306 (e.g., cushion or ear tip) and adapt some aspect of its behavior accordingly.

Figures 24, 25:
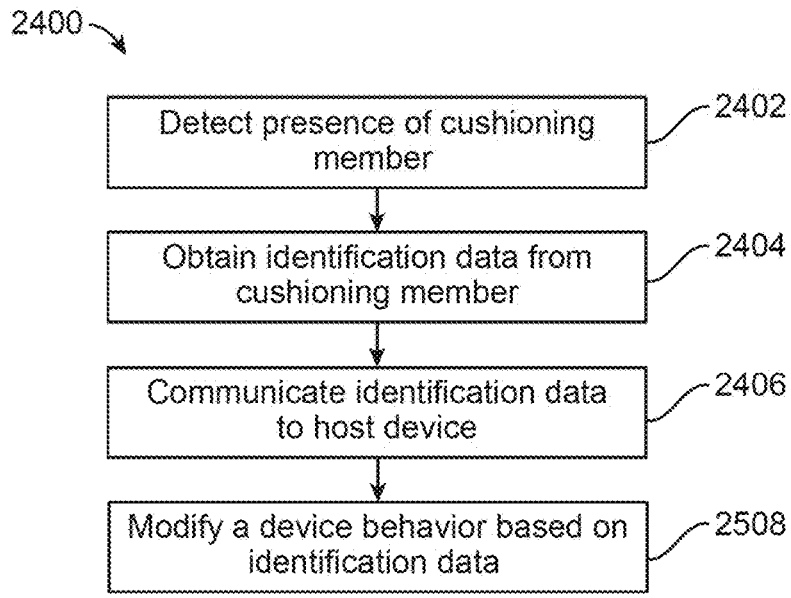
FIG. 24 shows a flow diagram of a cushion-identification process that can be performed in an earpiece system according to some embodiments.
FIG. 25 shows a table with examples of mapping an ID value to characteristics of a cushioning component according to some embodiments.

FIG. 24 is a flow diagram of a process 2400 that can be performed in an earpiece system such as earpiece system 300 of FIG. 3 according to some embodiments. At block 2402, process 2400 can detect the presence of cushioning member 304. For example, earpiece 302 may include a proximity or presence sensor that detects when cushioning member 306 is attached by a user. Examples of proximity sensors are known in the art and include, e.g., Hall effect sensors that can respond to a magnetic element disposed within cushioning member 306, optical sensors that can detect occlusion by cushioning member 306, mechanical switches that may be deflected into a different position when cushioning member 306 is attached, or the like. As another example, earpiece 302 can periodically poll tag sensor 314 to determine whether a cushioning member is present. A particular presence detection mechanism or process is not required.

At block 2404, process 2400 can obtain identification data (or identification information) from cushioning member 306, e.g., by operating tag sensor 314 and ID logic 334 to read identification tag 308. Identification tag 308 can encode identification data using a variety of physical structures, including any of the above-described magnetic, RF-based, resonance-based, optical, acoustic, capacitive, or electrical structures, or any other structure. As used herein, identification data can provide at least some additional information beyond merely indicating presence or absence of a cushioning member. For example, the identification data can represent any or all of: a manufacturer identifier; a model identifier; a size identifier; a color identifier; a device-class identifier (e.g., indicating presence or absence of various capabilities or characteristics); a unique serial number; and so on. Identification data can be encoded in or on identification tag 308 in any manner that enables earpiece 302 to read or receive the identification data while cushioning member 306 is attached, including any or all of the examples described above.

In embodiments where earpiece system 300 operates as an accessory to a host device 350, at block 2406, process 2400 can communicate the identification data to the host device, e.g., via communication interface 316. Communication of identification data to a host device is not required, and in some embodiments a host device may not be present.

At block 2408, earpiece system 300 and/or host device 350 can modify a device behavior based on the identification data. In some embodiments, the modification applies to the earpiece. For example, an equalizer setting for earpiece 302 can be selected or modified based (entirely or in part) on the identification data. As another example, settings related to hearing protection can be modified, such as volume limits, active noise cancellation profiles, or the like. In some embodiments where earpiece 302 is used as an accessory for host device 350, and behavior of host device 350 can be modified. The modified behavior of host device 350 can, but need not, relate to providing audio to earpiece 302. For instance, the host device may provide a graphical user interface that includes an image of a personal audio device with which the host device is currently interoperating. In some embodiments, the image can be modified based on the identification data, e.g., by changing the color, shape, or other aspects of appearance of the cushioning member in the image to resemble aspects of the particular cushioning member that is currently attached.

It will be appreciated that process 2400 is illustrative and that variations and modifications are possible. For instance, in some embodiments, the operations of detecting presence of a cushioning member and obtaining identification data from the cushioning member can be combined. In some embodiments, a personal audio device can include two instances of earpiece system 300 (one for each ear). Where this is the case, each earpiece 302 can read the ID tag 308 of its attached cushioning member 304 and can communicate the identification data to the other earpiece 302 and/or to host device 305. (If the identification data read by the two earpieces is not consistent, e.g., the cushions are of two different types, various actions can be taken. For example, the user can be alerted to the mismatch. In some embodiments, host device 350 can determine which identification data to use for modifying device behavior.) In some embodiments, an ID tag 308 may be included in only one cushioning member of a pair, in which case only one earpiece 302 would read an ID tag 308. In some embodiments, identification data can be used for other purposes in addition to (or instead of) modifying device behavior.

3.2. Using Identification Data

Depending on the particular identification data available in a given embodiment, an earpiece and/or host device can use identification data in a number of ways. By way of example of identification data, FIG. 25 shows a table 2500 with examples of mapping an ID value (column 2502) to characteristics of a cushioning member according to some embodiments. In this example, the cushioning members are ear tips that attach to earbuds. Different ear tips can be distinct in size, color, material, and/or manufacturer. Each ID value in column 2502 maps to a different combination of size, color, material, and manufacturer. ID tag 308 for a given ear tip can encode one of the defined ID values, and ID logic 334 can use tag sensor 314 to determine which ID value is encoded in a particular ID tag 308. Earpiece 302 or host device 350 can decode the ID value, e.g., by referring to a lookup table implementing table 2500, to determine the corresponding characteristics of size, color, material and manufacturer. It should be understood that table 2500 is an example. Depending on the amount (e.g., number of bits) of identification data available in a particular tag, more or fewer characteristics can be distinguished and/or a given characteristic can have more or fewer distinct values.

3.2.1. Behavior Modification

As described above with reference to FIG. 24, an earpiece 302 and/or host device 350 can modify its behavior based on identification data for an attached cushioning member 306. The particular modification of behavior in various embodiments can depend on the type of information available, as well as the capabilities of earpiece 302 and/or host device 350. Examples will now be described.

In some embodiments, an earpiece 302 and/or host device 350 can modify its behavior by changing audio output characteristics based on the cushion type identified by the cushion identification data. For instance, it is known in the art that equalizer settings can be used to improve perceived sound quality of a speaker. The audible frequency spectrum can be subdivided into a number of bands, and the relative responses in different bands can be increased or decreased according to the equalizer settings. Optimal equalizer settings may depend in part on the characteristics of the speaker. In the case of personal audio devices such as earphones and headphones, cushioning members made of different materials and/or having different geometries (size and/or shape) can have different effects on sound waves produced by a speaker; hence, the optimal equalizer settings can be different for cushioning members of different types.

Accordingly, in some embodiments, the identification data can include a device class identifier that distinguishes cushion types based on materials and/or geometry. The earpiece or host device can store a lookup table that maps each device class identifier to recommended equalizer settings and can select equalizer settings based at least in part on the device class identifier. In some embodiments, the recommended equalizer settings based on device class identifier can indicate adjustments to a baseline equalizer setting that is determined based on other factors, such as the type of audio being produced (e.g., music vs. spoken word, particular genre of music, etc.) and/or information about the environment.

As another example, some earpieces (or host devices) can provide active noise cancellation. In active noise cancellation, a secondary audio signal is generated that is intended to cancel out ambient sounds that may leak into the user's ear (e.g., airplane engine noise), and the secondary audio signal can be played in isolation or combined (mixed) with a primary audio signal that the user is listening to. The effectiveness of noise cancellation in a given earpiece can depend on the properties of the cushioning member; for instance, different cushioning members may admit different amounts of ambient sound, and the amount of admitted sound may depend on frequency.

Accordingly, in some embodiments, a noise cancellation profile used to generate a secondary audio signal for an earpiece can be modified based on identification data (e.g., a device class identifier) obtained from the cushioning member. In some cases, modifying a noise cancellation profile may include enabling or disabling active noise cancellation, or increasing or decreasing the strength of the secondary audio signal either globally or within specific frequency bands.

As another example, some cushioning members may belong to a device class that is designed for use in environments where it is desirable to reduce ambient noise but not to suppress specific sounds (e.g., human speech). In some embodiments, when the identification data indicates that a cushioning member belongs to this device class, appropriate sound-filtering or active noise cancellation algorithms can be automatically applied.

As yet another example, some cushioning members may be designed for use by children, who can be particularly vulnerable to hearing damage caused by prolonged exposure to loud sounds. In some embodiments, when the identification data indicates that a cushioning member is designed for children, volume limits can automatically be applied to the speaker of the personal audio device, which can help to protect the user's ears. It should be understood that volume-limiting operations are not applicable only to children, and volume limits can be associated with any device class.

As still another example, some embodiments described above use cushion identification to determine whether a cushioning member is attached to the earpiece. One specific example is described above in the context of acoustic identification techniques, but any of the techniques described above for reading an identification tag can also indicate whether an identification tag (and presumably a cushioning member) is present or not. In some embodiments, an earpiece may be designed for use either with or without a cushioning member, and audio characteristics can be modified based on whether a cushioning member is attached. In other embodiments, an earpiece may be designed for use only with a cushioning member, and the behavior modification when a cushioning member is not detected can include, e.g., notifying the user to attach a cushioning member or not generating sound in the earpiece (or only a low level of sound) when no cushioning member is present.

Other behavior modifications can relate to user interface features. For example, a host device with which a personal audio device interoperates can have a graphical user interface that shows an icon or image representing the personal audio device. In some embodiments, the icon or image can be modified based on the identification data. For example, if the identification data identifies the shape, color, or other visual characteristics of the cushioning member that is currently attached, the icon or image can be modified to reflect the actual shape, color, or other visual characteristics of the cushioning member.

It should be understood that these examples of device behavior modification are illustrative. Other behavior modifications can be implemented, and different sets of behavior modifications can be associated with different identification data. In some embodiments, the user can have an option to override the behavior modification, e.g., via a user interface of the host device, via voice command, or the like.

It should also be understood that in some instances a cushion identification process might fail to read the cushion identification data due to various circumstances, such as absence of or damage to the identification tag, transient errors in a tag sensor, or the like. Accordingly, some embodiments may implement a default behavior mode when cushion identification fails. A default behavior mode can include, for example: operating with default equalizer and/or active noise cancellation profiles; rendering a default cushion image in a graphical user interface; and so on.

3.2.2. Assisting User with Cushion Selection

In some embodiments, identifying information for a cushioning member that is currently attached to an earpiece can be used to assist a user in selecting a cushioning member to optimize the user's audio experience.

Figure 26:
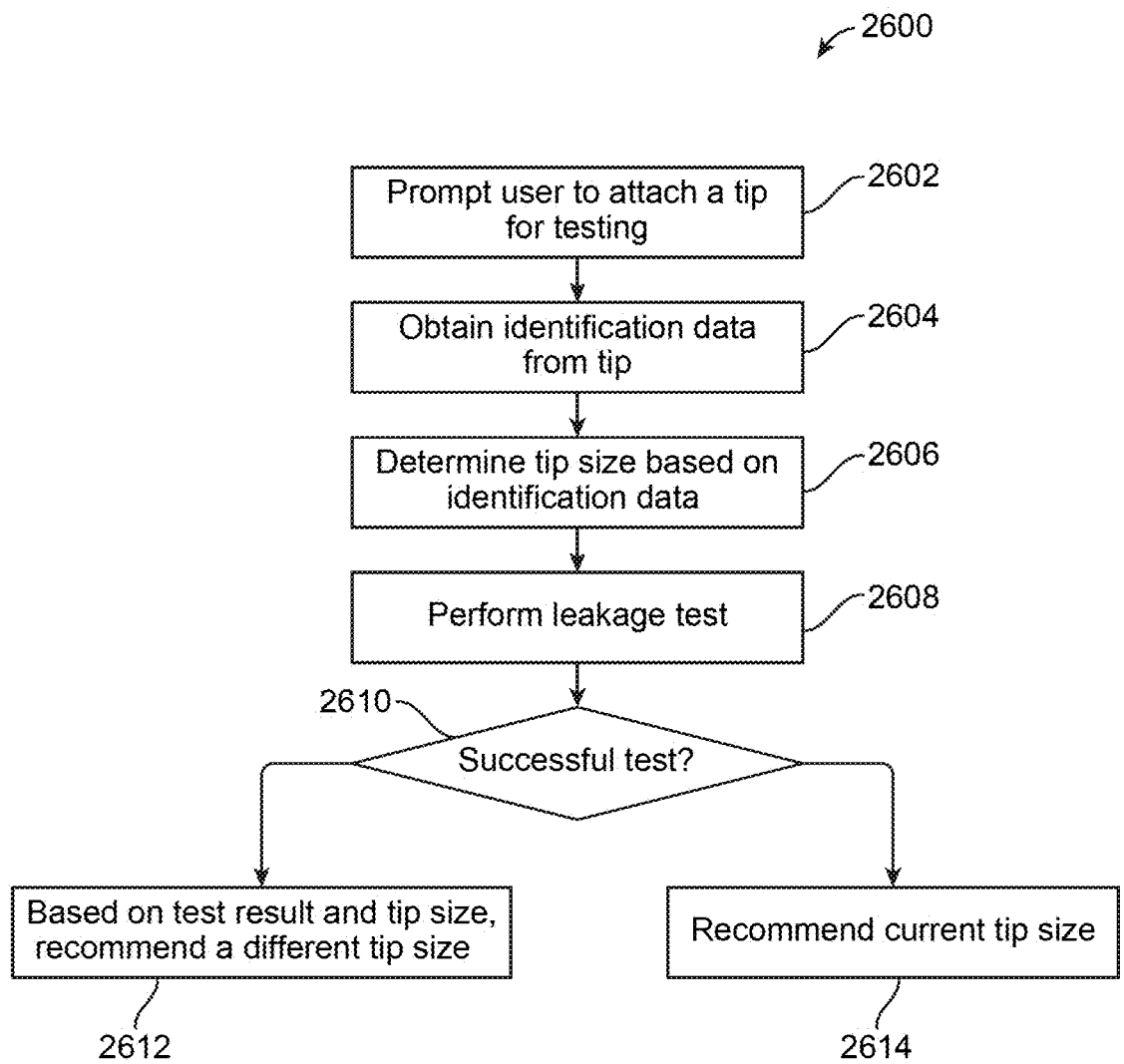
FIG. 26 shows a flow diagram of a fitting process for an ear tip according to some embodiments.

For example, in some embodiments where size of the cushioning member is a characteristic that can be determined from ID tag 308, the identification data can be used to assist a user in selecting a cushioning member of optimal size. FIG. 26 shows a flow diagram of a fitting process 2600 according to some embodiments. Fitting process 2600 can be implemented, e.g., in a host device that interoperates with an earpiece, such as host device 350 of FIG. 3 interoperating with earpiece system 300.

At block 2602, process 2600 can prompt the user to attach a cushioning member (e.g., an ear tip) to an earpiece (e.g., an earbud) in order to perform size testing. For example, a host device can provide the prompt via a graphical user interface or voice prompt. Once the user has attached the ear tip, at block 2604 process 2600 can obtain identification data from the ear tip. In some embodiments, block 2604 can be similar to block 2404 of process 2400 described above, and any of the identification tags and compatible tag sensors and identification logic described above can be used. Identification data can be varied as desired, provided that the identification data enables determination of a size parameter for the ear tip.

At block 2606, process 2600 can determine the size parameter for the ear tip based on the identification data. In some embodiments, the identification data may include a numerical value that maps directly to a size (e.g., numerical values 0, 1, 2 can map to sizes small, medium, and large). In other embodiments, size can be determined by a lookup operation on the identification data (e.g., using table 2500 of FIG. 25) or the like.

At block 2608, process 2600 can perform an audio leakage test. Examples of leakage tests for earpieces are known in the art and can include detecting external sounds leaking in through the earpiece and/or detecting sounds produced by the earpiece leaking out to the environment. A particular test is not relevant to understanding the present disclosure. At block 2610, process 2600 can determine whether the leakage test was successful. For instance, success or failure of a leakage test can be defined based on whether the level of sound leakage is below or above some preset threshold. In the event of failure, at block 2612 process 2600 can provide a recommendation for another size to try next. Because process 2600 has determined the size of the ear tip that was tested, the recommendation can be more specific than a general suggestion to try a different size. For instance, based on the current size and the leakage test result, process 2600 can provide a recommendation to try a larger (or smaller) size or to try a specific size. If, at block 2610, the leakage test succeeds, then at block 2614 process 2600 can confirm that the currently-attached size provides appropriate protection against sound leakage.

It will be appreciated that process 2600 is illustrative and can be modified. Process 2600 can be used with a variety of leakage tests and a variety of earpieces and cushioning members (including cushions for ear cups). Similar processes can also be used to assess whether a particular cushioning member is providing satisfactory audio performance and to recommend a different cushioning member that may provide improved performance. For example, in addition to or instead of having different sizes, different types of cushioning members may be made of different materials that provide different levels of insulation from external sounds, and a recommendation for a cushioning member made of a particular material can be made based on leakage tests and/or user feedback regarding the subjective audio experience. In some embodiments, a process such as process 2600 can be implemented entirely within the earpiece, e.g., using indicator lights or voice prompts to communicate test results and recommendations.

3.2.3. Additional Uses of Cushioning Member Identification Data

Embodiments described above can leverage a variety of data encoding and reading technologies to encode and read identification data for a cushion. As described above, different technologies can enable different amounts of information to be encoded, from 1 or 2 bits up to several kilobytes. Accordingly, many types of information can be encoded, including materials, manufacturer name, date of manufacture, and/or a unique cushion identifier (e.g., a serial number). Where available, detailed identification data, such as a unique cushion identifier, can be used for a variety of purposes. For example, some embodiments, a cushioning member can be made (entirely or in part) of foam and/or elastic materials that may degrade (e.g., become rigid or excessively pliant) after a long period of use or even without use due to aging of the materials. In embodiments where the identification data uniquely identifies a specific cushioning member (e.g., by serial number), a personal audio device or an associated host device can monitor and track usage history of that cushioning member, e.g., by tracking cumulative hours of use. In some embodiments, the personal audio device or associated host device can generate a notification to the user when the usage history indicates that the cushioning member may be due for maintenance (e.g., cleaning) or replacement. Similarly, if the identification data provides information usable to determine the age of the cushioning member (e.g., a date of manufacture), the personal audio device or associated host device can determine whether the cushioning member should be replaced due to age (with or without reference to any usage history information). In some embodiments, usage monitoring can be performed with less-granular cushion identification data. For example, referring to FIG. 25, it may be assumed that a particular user has only one set of large red ear tips from manufacturer MFR 1, and usage monitoring can be based on that assumption.

As another example, where the identification data uniquely identifies a specific cushioning member, the behavior of the personal audio device can be modified according to user-specific preferences when a particular cushioning member is identified as being attached. For instance, while a particular cushioning member is attached, a user may adjust equalizer settings, noise cancellation preferences, volume settings, volume limits, or other operating parameters for the personal audio device. In some embodiments, the personal audio device (or a host device with which the personal audio device interoperates) can save the user preferences in association with the identification data for the cushioning member. The next time the same cushioning member is identified by the personal audio device (or by the host device, as the case may be), the saved user preferences can be automatically retrieved and applied. In other embodiments, user preferences can be saved in association with identification data at a less granular level; for instance user preferences can be stored in association with an identifier of a specific device class rather than a specific cushioning member, and the stored preferences can be applied whenever a cushioning member is identified as having that device class. In some embodiments, a host device that saves user preferences associated with a particular cushioning member (or device class) can share the saved preferences with other devices that can act as host devices (e.g., other personal electronic devices belonging to the same user). Accordingly, a user can easily transfer user preferences associated with a particular cushioning member (or device class) to another host device.

In some embodiments, a cushioning member (referred to herein as an "advanced" cushioning member) may include active circuitry implementing additional capabilities beyond cushioning and/or sound insulation. For example, one or more sensors can be embedded into a cushioning member to detect a user's pulse, temperature, perspiration, or other biometric information. (The particular type or capability of the sensor(s) embedded in a cushioning member may be varied as desired.) Identification data for an advanced cushioning member can include data indicating the particular capabilities of the advanced cushioning member (e.g., the sensor type(s) of embedded sensor(s)), and the earpiece (and/or a host device) can modify a behavior accordingly. For example, the earpiece can enable supplying of power to the cushioning member when an advanced cushioning member is identified and disable supplying of power otherwise. As another example, based on the identification data for a particular cushioning member, an earpiece (or a host device) can determine when to read sensor data from the cushioning member and/or how to interpret received sensor data. It will be appreciated that a wide variety of advanced capabilities can be selectively enabled or disabled based on identification data obtained from a particular cushioning member.

4. Additional Embodiments

While the invention has been described with respect to specific embodiments, one skilled in the art will recognize that numerous modifications are possible. For example, although the description makes reference to ear tips that may be positioned at least partially within the user's ear canal and to cushions that may be worn on the ear or over the ear, similar principles can be applied to any cushioning member that can be detachably attached to an earpiece of a personal audio device. The particular size and shape of a cushioning member or an earpiece can be modified as desired.

The amount, content, and format of identification data or identification information can be varied as desired. Identification data can range from a small amount of data (e.g., two or three bits) specifying size or color to an arbitrarily long number (which can be represented, e.g., as bit string) that uniquely identifies a particular cushioning member. In some embodiments, identification data can be structured. For instance, if the identification data is represented as a bit string, one portion of the bit string may identify a device class, another portion may identify a manufacturer, and so on. Lookup tables or the like can also be used to map arbitrary numerical identification data to a particular combination of properties of a cushioning member.

As described above, identification data can be used to modify device behavior, including the production of sound by the earpiece, user interface features, interactions between the earpiece and cushioning member (e.g., reading sensor data), and so on. Identification data can also be used to monitor the condition of a particular cushioning member and to notify the user when a cushioning member may benefit from maintenance (e.g., cleaning) or replacement. Other behavior modifications and/or user-supportive operations can be implemented based on the identification data.

Some embodiments described above refer to a single earpiece and a single cushioning member. It should be understood that a personal audio device may include a pair of earpieces of like design (e.g., as shown in FIGS. 1 and 2) and that cushioning members may likewise be provided in pairs of like design. Where cushioning members are provided in pairs, an identification tag can be included in either or both cushioning members of the pair, and reader circuitry to read the identification tag may be included in either or both earpieces. If reader circuitry in the two earpieces of a pair detect a discrepancy in identification data between their respective cushioning members (e.g., identification data indicating different device classes or sizes), various responsive actions can be taken. For example, the user can be notified of the discrepancy; audio settings for the two earpieces can be modified differently based on the identification data of their respective cushion members; or audio settings for both earpieces can be selected based on blending audio settings associated with the two cushioning members.

Various features described herein, e.g., methods, apparatus, computer-readable media and the like, can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features described herein may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

In some embodiments, the identification data can uniquely identify a particular cushioning member that belongs to a particular user; where this is the case, the identification data might be regarded as personally identifiable information. It is well understood that the use of personally identifiable information should follow privacy policies and practices that are generally recognized as meeting or exceeding industry or governmental requirements for maintaining the privacy of users. In particular, personally identifiable information should be managed and handled so as to minimize risks of unintentional or unauthorized access or use, and the nature of authorized use should be clearly indicated to users. For instance, in some embodiments, identification data for a cushion or tip need not be provided to any entity other than the earpiece or (optionally) a user-owned host device with which the earpiece interoperates. Users may be informed of and prompted to opt in to any sharing of data that may occur.

Thus, although the invention has been described with respect to specific embodiments, it will be appreciated that the invention is intended to cover all modifications and equivalents within the scope of the following claims.

What is claimed is:

1. A cushioning member for an earpiece of a personal audio device, the cushioning member comprising:
    a body having a first surface to be placed in contact with a user's ear area and a second surface, at least the first surface being made of a compliant material; and
    a first magnetic attachment structure disposed on the second surface and configured to attach the cushioning member to an earpiece of a personal audio device,
    wherein a geometric property of the first magnetic attachment structure encodes identification data for the cushioning member.

2. The cushioning member of claim 1 wherein the first magnetic attachment structure comprises a metallic plate that shunts magnetic fields.

3. The cushioning member of claim 1 wherein the geometric property includes a size of the first magnetic attachment structure.

4. The cushioning member of claim 1 wherein the geometric property includes a presence or absence of a gap or split in the first magnetic attachment structure.

5. The cushioning member of claim 1 wherein a plurality of magnetic attachment structures, including the first magnetic attachment structure, are disposed on the second surface and wherein a respective geometric structure of each of the plurality of magnetic attachment structures encodes at least one bit of identification data.

6. The cushioning member of claim 5 wherein the body of the cushioning member has corner regions and one of the plurality of magnetic attachment structures is positioned in each of the corner regions.

7. An earpiece for a personal audio device, the earpiece comprising:
    a housing having a proximal surface;
    a speaker disposed in the housing;
    a first magnetic attachment structure disposed on the proximal surface and configured to attach to a cushioning member;
    a first tag sensor disposed at or near the proximal surface and configured to generate a signal responsive to a magnetic flux affected by attachment of the cushioning member;
    identification logic coupled to the first tag sensor and configured to determine identification data for the cushioning member based at least in part on the signal from the first tag sensor; and
    a controller coupled to the identification logic and configured to receive the identification data from the identification logic.

8. The earpiece of claim 7 wherein the first magnetic attachment structure comprises an array of magnets configured to form a magnetic flux loop when a magnetic shunt element of the cushioning member is in proximity to the array of magnets.

9. The earpiece of claim 8 wherein the array of magnets is configured such that the magnetic flux loop is directed either through or away from the first tag sensor, depending on a geometric property of the magnetic shunt element.

10. The earpiece of claim 9 wherein the first tag sensor comprises a Hall effect sensor placed adjacent to the array of magnets.

11. The earpiece of claim 9 wherein the first tag sensor comprises a Hall effect sensor placed between two magnets in the array of magnets.

12. The earpiece of claim 7 wherein the first tag sensor comprises a Hall effect sensor.

13. The earpiece of claim 7 wherein a plurality of magnetic attachment structures, including the first magnetic attachment structure, are disposed on the proximal surface and each of the plurality of magnetic attachment structures has an associated tag sensor.

14. The earpiece of claim 13 wherein each of the tag sensors provides at least one bit of identification data to the identification logic.

15. An earpiece system for a personal audio device, the earpiece system comprising:
    a cushioning member having:
        a body having a first surface to be placed in contact with a user's ear area and a second surface, at least the first surface being made of a compliant material; and
        a first cushion-side magnetic attachment structure disposed on the second surface and configured to attach the cushioning member to an earpiece of a personal audio device,
        wherein a geometric property of the first cushion-side magnetic attachment structure encodes identification data for the cushioning member; and
    an earpiece having:
        a housing having a proximal surface;
        a speaker disposed in the housing;
        a first earpiece-side magnetic attachment structure disposed on the proximal surface and configured to attach to the first cushion-side magnetic attachment structure;
        a first tag sensor disposed at or near the proximal surface and configured to generate a signal responsive to a magnetic flux affected by attachment of the cushioning member;
        identification logic coupled to the first tag sensor and configured to determine identification data for the cushioning member based at least in part on the signal from the first tag sensor; and a controller coupled to the identification logic and configured to receive the identification data from the identification logic.

16. The earpiece system of claim 15 wherein the first cushion-side magnetic attachment structure comprises a metallic plate that shunts magnetic fields.

17. The earpiece system of claim 15 wherein the geometric property includes a size of the first cushion-side magnetic attachment structure.

18. The earpiece system of claim 15 wherein the geometric property includes a presence or absence of a gap or split in the first cushion-side magnetic attachment structure.

19. The earpiece system of claim 15 wherein the first earpiece-side magnetic attachment structure comprises an array of magnets configured to form a magnetic flux loop when the first cushion-side magnetic attachment structure of the cushioning member is in proximity to the array of magnets.

20. The earpiece system of claim 19 wherein the first tag sensor includes a Hall effect sensor placed adjacent to one or more of the magnets in the array of magnets.

21. The earpiece system of claim 15 wherein a plurality of cushion-side magnetic attachment structures, including the first cushion-side magnetic attachment structure, are disposed on the second surface of the cushioning member and wherein a respective geometric structure of each of the plurality of cushion-side magnetic attachment structures encodes at least one bit of identification data; and a plurality of earpiece-side magnetic attachment structures, including the first earpiece-side magnetic attachment structure, are disposed on the proximal surface and each of the plurality of earpiece-side magnetic attachment structures has an associated tag sensor.

* * * * *